United States Patent
Hirokubo

(10) Patent No.: US 9,658,446 B2
(45) Date of Patent: May 23, 2017

(54) SEALING STRUCTURE, INTERFERENCE FILTER, OPTICAL MODULE, AND ELECTRONIC APPARATUS

(71) Applicant: Seiko Epson Corporation, Tokyo (JP)

(72) Inventor: Nozomu Hirokubo, Fujimi-machi (JP)

(73) Assignee: Seiko Epson Corporation (JP)

( * ) Notice: Subject to any disclaimer, the term of this patent is extended or adjusted under 35 U.S.C. 154(b) by 386 days.

(21) Appl. No.: 14/215,573

(22) Filed: Mar. 17, 2014

(65) Prior Publication Data

US 2014/0263983 A1    Sep. 18, 2014

(30) Foreign Application Priority Data

Mar. 18, 2013    (JP) .................. 2013-054682

(51) Int. Cl.
| | |
|---|---|
| H01J 40/14 | (2006.01) |
| H01J 5/02 | (2006.01) |
| G02B 26/00 | (2006.01) |
| G01J 3/26 | (2006.01) |

(52) U.S. Cl.
CPC ............. *G02B 26/001* (2013.01); *G01J 3/26* (2013.01); *Y10T 428/24562* (2015.01)

(58) Field of Classification Search
CPC .......... G01J 3/26; G01J 1/0492; G01J 1/0488; G02B 26/001
USPC ......... 250/226, 239, 221; 359/305, 308–310, 359/885, 891, 577–579, 588, 589, 850, 359/851, 854, 855, 856, 857, 861, 862; 356/450, 454, 505, 506
See application file for complete search history.

(56) References Cited

U.S. PATENT DOCUMENTS

| | | |
|---|---|---|
| 4,859,060 A | 8/1989 | Katagiri et al. |
| 2003/0072009 A1 | 4/2003 | Domash et al. |
| 2005/0068627 A1 | 3/2005 | Nakamura et al. |
| 2005/0185237 A1 | 8/2005 | Nakajima |
| 2006/0183644 A1 | 8/2006 | Nakamura et al. |
| 2006/0196408 A1 | 9/2006 | Hashimoto |
| 2009/0014822 A1* | 1/2009 | Poo .................. H01L 27/14618 257/432 |

(Continued)

FOREIGN PATENT DOCUMENTS

| | | |
|---|---|---|
| JP | 62-257032 | 11/1987 |
| JP | 11-111880 | 4/1999 |

(Continued)

*Primary Examiner* — Pascal M Bui-Pho
(74) *Attorney, Agent, or Firm* — Harness, Dickey & Pierce, P.L.C.

(57) ABSTRACT

An interference filter includes a first substrate on which a fixed reflection film is provided, a second substrate which faces the first substrate and on which a movable reflection film is provided, a first bonding film that bonds the first substrate and the second substrate to each other, and a sealer that is disposed between the first substrate and the second substrate in a first interspace that allows a first internal space sandwiched between the first substrate and the second substrate to communicate with a space outside the interference filter, the sealer sealing the first internal space, and an inter-substrate distance between the first substrate and the second substrate in the first interspace decreases in a direction from outer circumferential edges of the substrates toward an inner portion of the first interspace in a plan view viewed in a substrate thickness direction.

15 Claims, 15 Drawing Sheets

(56) References Cited

U.S. PATENT DOCUMENTS

| | | |
|---|---|---|
| 2010/0315634 A1 | 12/2010 | Shibayama |
| 2011/0062825 A1 | 3/2011 | Kawahara |
| 2013/0038876 A1 | 2/2013 | Arakawa et al. |
| 2013/0200251 A1* | 8/2013 | Velichko ........... H01L 31/02327 250/208.1 |
| 2014/0063501 A1 | 3/2014 | Hirokubo |

FOREIGN PATENT DOCUMENTS

| | | |
|---|---|---|
| JP | 2001-277198 A | 10/2001 |
| JP | 2002-062539 A | 2/2002 |
| JP | 2002-116390 A | 4/2002 |
| JP | 2005-055790 A | 3/2005 |
| JP | 2005-062384 A | 3/2005 |
| JP | 2005-062386 A | 3/2005 |
| JP | 2005-510756 A | 4/2005 |
| JP | 2005-309099 A | 11/2005 |
| JP | 2005-309174 A | 11/2005 |
| JP | 2005-345866 A | 12/2005 |
| JP | 3786106 B2 | 6/2006 |
| JP | 2006-235606 A | 9/2006 |
| JP | 2006-237200 A | 9/2006 |
| JP | 2006-245098 A | 9/2006 |
| JP | 2006-264216 A | 10/2006 |
| JP | 2007-149816 A | 6/2007 |
| JP | 2009-210416 A | 9/2009 |
| JP | 2010-192627 A | 9/2010 |
| JP | 4603489 B2 | 12/2010 |
| JP | 2011-066566 A | 3/2011 |
| JP | 2012-163912 A | 8/2012 |
| JP | 2012-173208 A | 9/2012 |
| JP | 2013-083850 A | 5/2013 |
| JP | 2014-048366 A | 3/2014 |
| WO | WO-03-046630 A1 | 6/2003 |

* cited by examiner

SEALING STRUCTURE, INTERFERENCE FILTER, OPTICAL MODULE, AND ELECTRONIC APPARATUS

BACKGROUND

1. Technical Field

The present invention relates to a sealing structure, an interference filter, an optical module, and an electronic apparatus.

2. Related Art

There is a known spectroscopic filter of related art that causes light to be reflected off and between a pair of reflection mirrors in such a way that light of a specific wavelength according to the distance between the reflection mirrors is acquired out of incident light whereas light that does not have the specific wavelength is eliminated in a destructive interference process. As a spectroscopic filter of this type, there is a known interference filter of wavelength tunable type (wavelength tunable interference filter) configured to be capable of adjusting the distance between the reflection mirrors to select the wavelength of light to be acquired (see JP-A-2005-309174, for example).

In general, a wavelength tunable interference filter is sensitive to moisture, foreign matter, and other environmental factors, which may degrade or otherwise affect a driver that changes the dimension between the mirrors and the mirrors themselves and hence degrade drive and optical characteristics of the interference filter, possibly resulting in a decrease in reliability thereof.

In contrast, the wavelength tunable interference filter described in JP-A-2005-309174 includes a first substrate on which a fixed reflection surface is formed, a second substrate which is so bonded to the first substrate that the second substrate faces the first substrate and on which a movable reflection surface is formed, and a glass substrate provided on the opposite side of the second substrate to the first substrate and bonded to the second substrate via a spacer. A sealed internal space is created between the first substrate and the second substrate, and another sealed internal space is created between the second substrate and the glass substrate.

In JP-A-2005-309174, since the first substrate and the second substrate are so bonded to each other that the internal space therebetween is sealed, usable bonding methods are limited. For example, direct bonding, anode bonding, surface activated bonding, and other bonding methods generally usable for hermetical sealing tend to be greatly sensitive to flatness of bonding surfaces and other conditions thereof. That is, the bonding surfaces need to be smooth, otherwise sufficient bonding strength will not be achieved.

On the other hand, bonding based on a plasma polymerization film or a resin is unlikely to be sensitive to the flatness of bonding surfaces and can hence achieve sufficient bonding strength but has a difficulty in maintaining sealing performance.

As described above, when a pair of substrates are so bonded to each other that the space created between the substrates is sealed and protected against the atmosphere, it is difficult to achieve both satisfactory bonding strength and sealing performance. In an interference filter, in particular, when the first substrate and the second substrate are bonded to each other, it is necessary to control the thickness of a bonding layer because the distance between the mirrors needs to be equal to a design value. In this case, usable bonding methods are limited. It is therefore further difficult to achieve both satisfactory bonding strength and sealing performance.

SUMMARY

An advantage of some aspects of the invention is to provide a sealing structure, an interference filter, an optical module, and an electronic apparatus that readily allow improvements in both the bonding strength and the sealing performance.

An aspect of the invention is directed to a sealing structure including a first substrate, a second substrate that faces the first substrate, a bonding portion that bonds the first substrate and the second substrate to each other, and a sealing portion that is disposed between the first substrate and the second substrate in an interspace that allows an internal space sandwiched between the first substrate and the second substrate to communicate with a space outside the sealing structure, the sealing portion sealing the internal space, and an inter-substrate distance between the first substrate and the second substrate in the interspace decreases in a direction from outer circumferential edges of the first substrate and the second substrate toward an inner portion of the interspace in a plan view in which the first substrate and the second substrate are viewed in a substrate thickness direction.

In the aspect of the invention, the first substrate and the second substrate are bonded to each other via the bonding portion, and the sealing portion that seals the internal space is disposed in the interspace.

The bonding and the sealing can therefore be performed by using different materials and methods. Therefore, the bonding portion can ensure satisfactory bonding strength, and the sealing portion can provide satisfactory sealing performance, whereby both the bonding strength and the sealing performance can be readily achieved in a satisfactory manner.

Further, in the interspace, the inter-substrate distance decreases in the direction from the outer circumferential edges of the substrates toward an inner portion of the interspace. Therefore, when the sealing portion is formed by introducing a sealing material inward through the outer circumferential edges of the substrates, the introduced distance of the sealing material, that is, a sealing distance over which the sealing portion seals the interspace can be increased, whereby the sealing performance can be improved.

In the sealing structure according to the aspect of the invention, it is preferable that the interspace is formed by a plurality of steps formed on at least one of the first substrate and the second substrate.

With this configuration, the interspace is formed by providing a plurality of steps in such a way that the inter-substrate distance decreases in the direction from the outer circumferential edges of the substrates toward an inner portion of the interspace. The steps can be readily formed, for example, in an etching process. The interspace can therefore be readily formed.

In the sealing structure according to the aspect of the invention, it is preferable that the interspace is formed by an inclined surface formed on at least one of the first substrate and the second substrate.

With this configuration, the interspace is formed by providing at least one of the first substrate and the second substrate with an inclined surface that causes the inter-substrate distance to decrease in the direction from the outer circumferential edges of the substrates toward an inner portion of the interspace. Therefore, when a sealing material is introduced between the substrates, the sealing material can be introduced into a deep portion, whereby the sealing performance of the sealing portion can be improved.

Another aspect of the invention is directed to an interference filter including a first substrate, a second substrate that faces the first substrate, a first reflection film that is provided on the first substrate, reflects part of incident light, and transmits at least part of the incident light, a second reflection film that is provided on the second substrate, faces the first reflection film, reflects part of incident light, and transmits at least part of the incident light, a bonding portion that bonds the first substrate and the second substrate to each other, and a sealing portion that is disposed between the first substrate and the second substrate in a first interspace that allows a first internal space sandwiched between the first substrate and the second substrate to communicate with a space outside the interference filter, the sealing portion sealing the first internal space, and an inter-substrate distance between the first substrate and the second substrate in the first interspace decreases in a direction from outer circumferential edges of the first substrate and the second substrate toward an inner portion of the interspace in a plan view in which the first substrate and the second substrate are viewed in a substrate thickness direction.

Each of the first reflection film and the second reflection film reflects part of incident light and transmits at least part of the incident light means that the following two cases fall within the scope of the invention: a case where part of the incident light is reflected, part of the incident light is transmitted, and the remainder of the incident light is absorbed; and a case where part of the incident light is reflected and the remainder of the incident light is transmitted.

In the aspect of the invention, the sealing portion that seals the first internal space and the first bonding portion that bonds the first substrate and the second substrate to each other are provided in the first interspace.

Therefore, the bonding portion can ensure satisfactory bonding strength, and the sealing portion can provide satisfactory sealing performance, whereby both the bonding strength and the sealing performance can be readily achieved in a satisfactory manner.

Further, in the first interspace, the inter-substrate distance decreases in the direction from the outer circumferential edges of the substrates toward an inner portion of the interspace, whereby the sealing distance over which the sealing portion seals the interspace can be increased and hence the sealing performance can be improved as described above.

Moreover, since the sealing performance can be improved, contamination of the first internal space due to external foreign matter can be suppressed, whereby degradation of the reflection films due to environmental factors can be suppressed. Degradation of drive and optical characteristics of the interference filter can therefore be suppressed, whereby the reliability of the interference filter can be maintained for a long period.

In the interference filter according to the aspect of the invention, it is preferable that the first interspace is formed by a plurality of steps formed on at least one of the first substrate and the second substrate.

With this configuration, the first interspace is formed by providing at least one of the first substrate and the second substrate with a plurality of steps. The steps can be readily formed, for example, in an etching process. An interference filter having satisfactory sealing performance can therefore be readily manufactured.

In the interference filter according to the aspect of the invention, it is preferable that the first interspace is formed by an inclined surface formed on at least one of the first substrate and the second substrate.

With this configuration, the first interspace is formed by providing at least one of the first substrate and the second substrate with an inclined surface that causes the inter-substrate distance to decrease in the direction from the outer circumferential edges of the substrates toward an inner portion of the interspace. A sealing material can therefore be introduced into a deep portion, whereby the sealing distance over which the sealing portion seals the interspace can be increased and hence the sealing performance of the sealing portion can be improved.

In the interference filter according to the aspect of the invention, it is preferable that the interference filter further includes a third substrate disposed on the opposite side of the second substrate to the first substrate and a second bonding portion that bonds the second substrate and the third substrate to each other, and the sealing portion is disposed between the second substrate and the third substrate in a second interspace that allows a second internal space sandwiched between the second substrate and the third substrate to communicate with a space outside the interference filter, the sealing portion sealing the second internal space, and an inter-substrate distance between the second substrate and the third substrate in the second interspace decreases in a direction from outer circumferential edges of the second substrate and the third substrate toward an inner portion of the second interspace in the plan view.

With this configuration, the second interspace, which is configured in the same manner as the first interspace, is provided between the second substrate and the third substrate, and the sealing portion is provided in the second interspace.

As a result, both the bonding strength and the sealing performance can be improved also between the second substrate and the third substrate.

Further, since the sealing performance in the second internal space can be improved, any change in pressure in the second internal space can be suppressed, whereby a decrease in spectroscopic precision due to a change in the pressure can be suppressed.

In the interference filter according to the aspect of the invention, it is preferable that the second interspace is formed by a plurality of steps formed on at least one of the second substrate and the third substrate.

With this configuration, the second interspace is formed by providing a plurality of steps in such a way that the inter-substrate distance decreases in the direction from the outer circumferential edges of the substrates toward an inner portion of the interspace, as in the case of the first interspace. The steps can be readily formed, for example, in an etching process. The second interspace can therefore be readily formed, and any change in the pressure in the second internal space can be readily suppressed.

In the interference filter according to the aspect of the invention, it is preferable that the second interspace is formed by an inclined surface formed on at least one of the second substrate and the third substrate.

With this configuration, the second interspace is formed by providing at least one of the second substrate and the third substrate with an inclined surface that causes the inter-substrate distance to decrease in the direction from the outer circumferential edges of the substrates toward an inner portion of the interspace. A sealing material can therefore be introduced into a deep portion in the second interspace, whereby the sealing distance over which the sealing portion seals the interspace can be increased and hence the sealing performance of the sealing portion can be improved. Any change in the pressure in the second internal space can therefore be more effectively suppressed.

In the interference filter according to the aspect of the invention, it is preferable that internal pressure in the first internal space and the second internal space is lower than the atmospheric pressure.

Lowering the pressure in the first internal space and the second internal space as described above can reduce, when the dimension of the gap between the first reflection film and the second reflection film is changed, resistance to movement of the moving reflection film, whereby satisfactory response of the moving reflection film can be provided.

In the interference filter according to the aspect of the invention, it is preferable that the interference filter further includes a gap changer that changes the dimension of a gap between the first reflection film and the second reflection film, and the second substrate has a through hole that allows the first internal space and the second internal space to communicate with each other.

With this configuration, the second substrate has a through hole that allows the first internal space and the second internal space to communicate with each other. The through hole can make the pressure in the first internal space and the second internal space uniform. Therefore, when the gap changer changes the dimension of the gap between the reflection films, the second substrate can be bent with precision because there is no difference in pressure between the internal spaces.

In the interference filter according to the aspect of the invention, it is preferable that the sealing portion is made of a paraxylene-based polymer.

With this configuration, the sealing material that forms the sealing portion is made of a paraxylene-based polymer (parylene). Parylene can be introduced into a minute interspace, and the sealing material can therefore be deposited in a deep portion of the interspace. The sealing distance can therefore be increased, whereby the sealing performance can be improved.

Further, since parylene can be deposited at room temperature, adverse effects of heat on the interference filter, that is, generation of stress due to thermal expansion, degradation of the reflection films, and other undesirable phenomena can be suppressed.

In the interference filter according to the aspect of the invention, it is preferable that the sealing portion is formed in an atomic layer deposition process or a chemical vapor deposition process.

Forming the sealing portion in an atomic layer deposition process or a chemical vapor deposition process allows, for example, a manufacturing process of forming a plurality of interference filters over a wafer and separating the wafer into a plurality of individual interference filters to be carried out at improved efficiency because the interspaces in the interference filters can be sealed in a single step.

In the interference filter according to the aspect of the invention, it is preferable that the bonding portion is a plasma polymerization film.

As a result, in the procedure of manufacturing the substrates, even when a plurality of processing steps cause the surface precision of the bonding surfaces of the substrates to deteriorate, a plasma polymerization film can smooth the irregularities of the surfaces. The substrates can therefore be securely bonded to each other without extra surface smoothing.

Another aspect of the invention is directed to an optical module including a first substrate, a second substrate that faces the first substrate, a first reflection film that is provided on the first substrate, reflects part of incident light, and transmits at least part of the incident light, a second reflection film that is provided on the second substrate, faces the first reflection film, reflects part of incident light, and transmits at least part of the incident light, a bonding portion that bonds the first substrate and the second substrate to each other, a sealing portion that is disposed between the first substrate and the second substrate in a first interspace that allows a first internal space sandwiched between the first substrate and the second substrate to communicate with a space outside the optical module, the sealing portion sealing the first internal space, and a detector that detects light extracted by the first reflection film and the second reflection film, and an inter-substrate distance between the first substrate and the second substrate in the first interspace decreases in a direction from outer circumferential edges of the first substrate and the second substrate toward an inner portion of the interspace in a plan view in which the first substrate and the second substrate are viewed in a substrate thickness direction.

The optical module according to the aspect of the invention includes the sealing portion, which seals the first internal space, and the bonding portion, which bonds the first substrate and the second substrate to each other, in the first interspace. The bonding and the sealing can therefore be performed by using different materials and methods, whereby both the bonding strength and the sealing performance can be readily achieved in a satisfactory manner, as in the aspect of the invention described above.

Further, in the optical module according to the aspect of the invention, the first interspace is so configured that the inter-substrate distance decreases in the direction from the outer circumferential edges of the substrates toward an inner portion of the interspace, whereby the sealing distance over which the sealing portion seals the interspace can be increased and hence the sealing performance can be improved as described above.

Moreover, since the sealing performance can be improved, contamination of the first internal space due to external foreign matter can be suppressed, whereby degradation of the reflection films due to environmental factors can be suppressed. Degradation of drive and optical characteristics of the optical module can therefore be suppressed, whereby the reliability of the optical module can be maintained for a long period.

Still another aspect of the invention is directed to an electronic apparatus including an interference filter including a first substrate, a second substrate that faces the first substrate, a first reflection film that is provided on the first substrate, reflects part of incident light, and transmits at least part of the incident light, a second reflection film that is provided on the second substrate, faces the first reflection film, reflects part of incident light, and transmits at least part of the incident light, a bonding portion that bonds the first substrate and the second substrate to each other, and a sealing portion that is disposed between the first substrate and the second substrate in a first interspace that allows a first internal space sandwiched between the first substrate and the second substrate to communicate with a space outside the interference filter, the sealing portion sealing the first internal space; and a control unit that controls the interference filter, and an inter-substrate distance between the first substrate and the second substrate in the first interspace decreases in a direction from outer circumferential edges of the first substrate and the second substrate toward an inner portion of the interspace in a plan view in which the first substrate and the second substrate are viewed in a substrate thickness direction.

The electronic apparatus according to the aspect of the invention includes the sealing portion, which seals the first internal space, and the bonding portion, which bonds the first substrate and the second substrate to each other, in the first interspace. The bonding and the sealing can therefore be performed by using different materials and methods, whereby both the bonding strength and the sealing performance can be readily achieved in a satisfactory manner, as in the aspect of the invention described above.

Further, in the electronic apparatus according to the aspect of the invention, the first interspace is so configured that the inter-substrate distance decreases in the direction from the outer circumferential edges of the substrates toward an inner portion of the interspace, whereby the sealing distance over which the sealing portion seals the interspace can be increased and hence the sealing performance can be improved as described above.

Moreover, since the sealing performance can be improved, contamination of the first internal space due to external foreign matter can be suppressed, whereby degradation of the reflection films due to environmental factors can be suppressed. Degradation of drive and optical characteristics of the electronic apparatus can therefore be suppressed, whereby the reliability of the electronic apparatus can be maintained for a long period.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments according to the invention will be described below with reference to the drawings. In the following drawings, the scales of each layer and each member are changed as appropriate so that the layer and the member are diagrammatically shown at recognizable sizes.
First Embodiment A first embodiment according to the invention will be described below with reference to the drawings.
Configuration of Spectroscopic Measurement Apparatus FIG. 1 is a block diagram showing a schematic configuration of a spectroscopic measurement apparatus according to the first embodiment of the invention.

A spectroscopic measurement apparatus 1 is an electronic apparatus that receives light under measurement reflected off an object X under measurement and analyzes the optical intensity of the light under measurement at each wavelength to measure an optical spectrum. When the object X under measurement is a light emitting object, such as a liquid crystal display, light emitted from the light emitting object may be the light under measurement.

Figure 1:
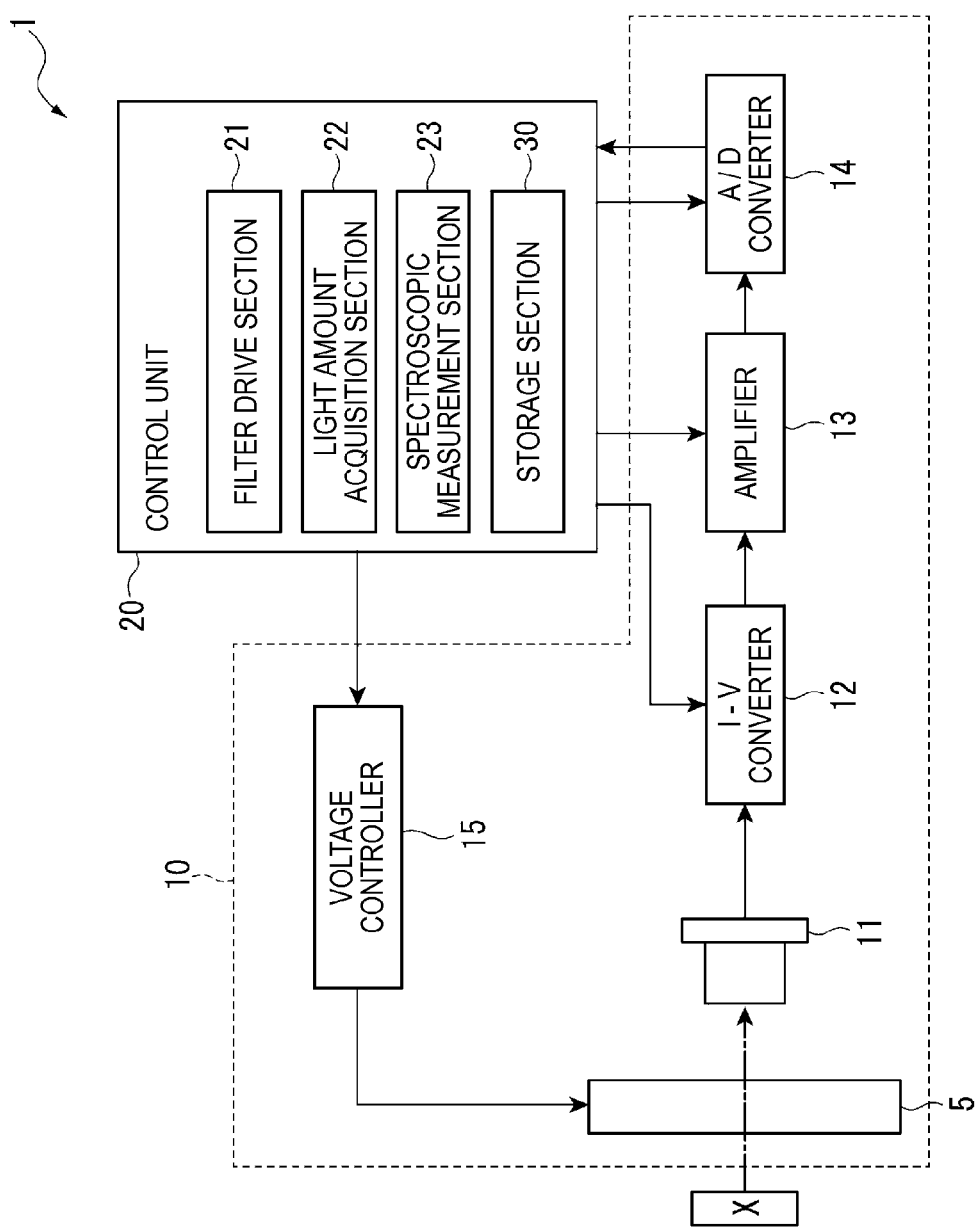
FIG. 1 is a block diagram showing a schematic configuration of a spectroscopic measurement apparatus of a first embodiment.

The spectroscopic measurement apparatus 1 includes an optical module 10 and a control unit 20, which controls the optical module 10, as shown in FIG. 1.
Configuration of Optical Module The optical module 10 includes a wavelength tunable interference filter 5, a detector 11, an I-V converter 12, an amplifier 13, an A/D converter 14, and a voltage controller 15.

Figure 2:
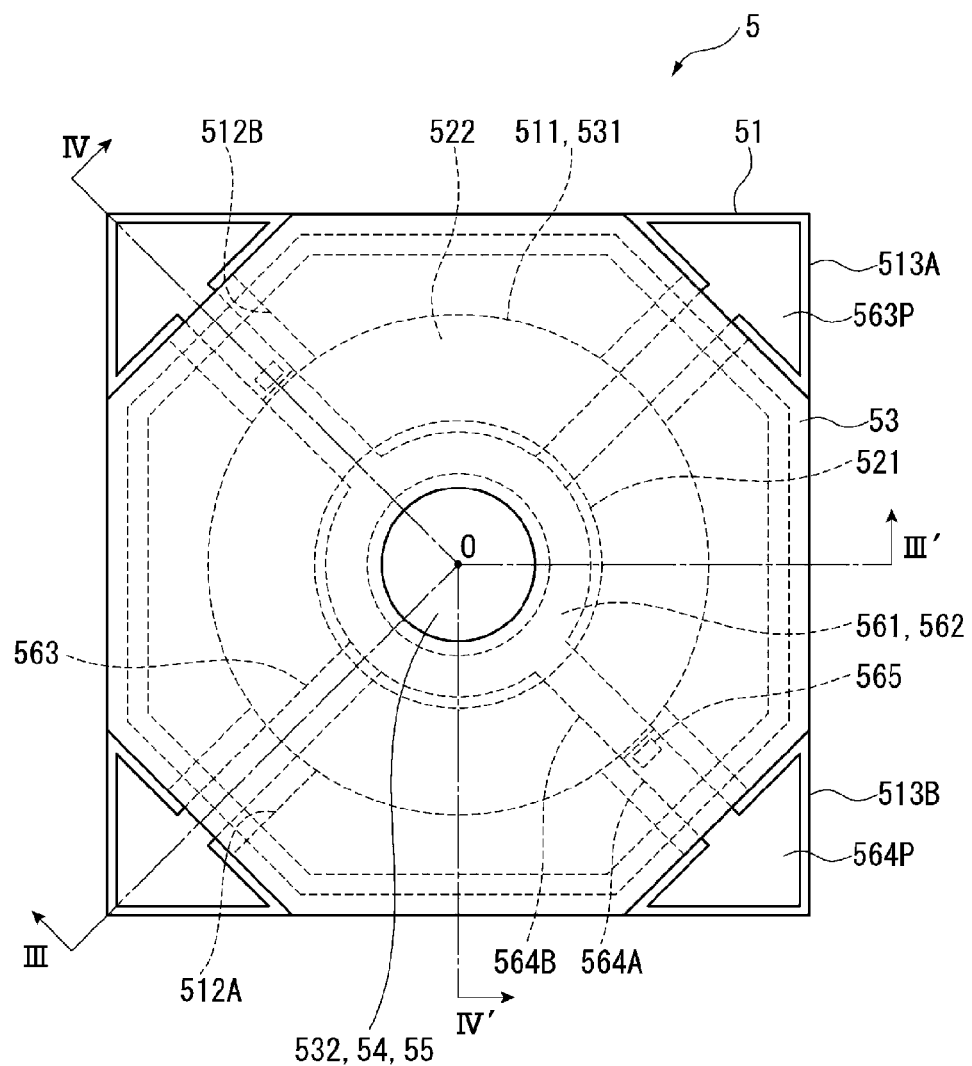
FIG. 2 is a plan view showing a schematic configuration of a wavelength tunable interference filter of the first embodiment.
Figure 3:
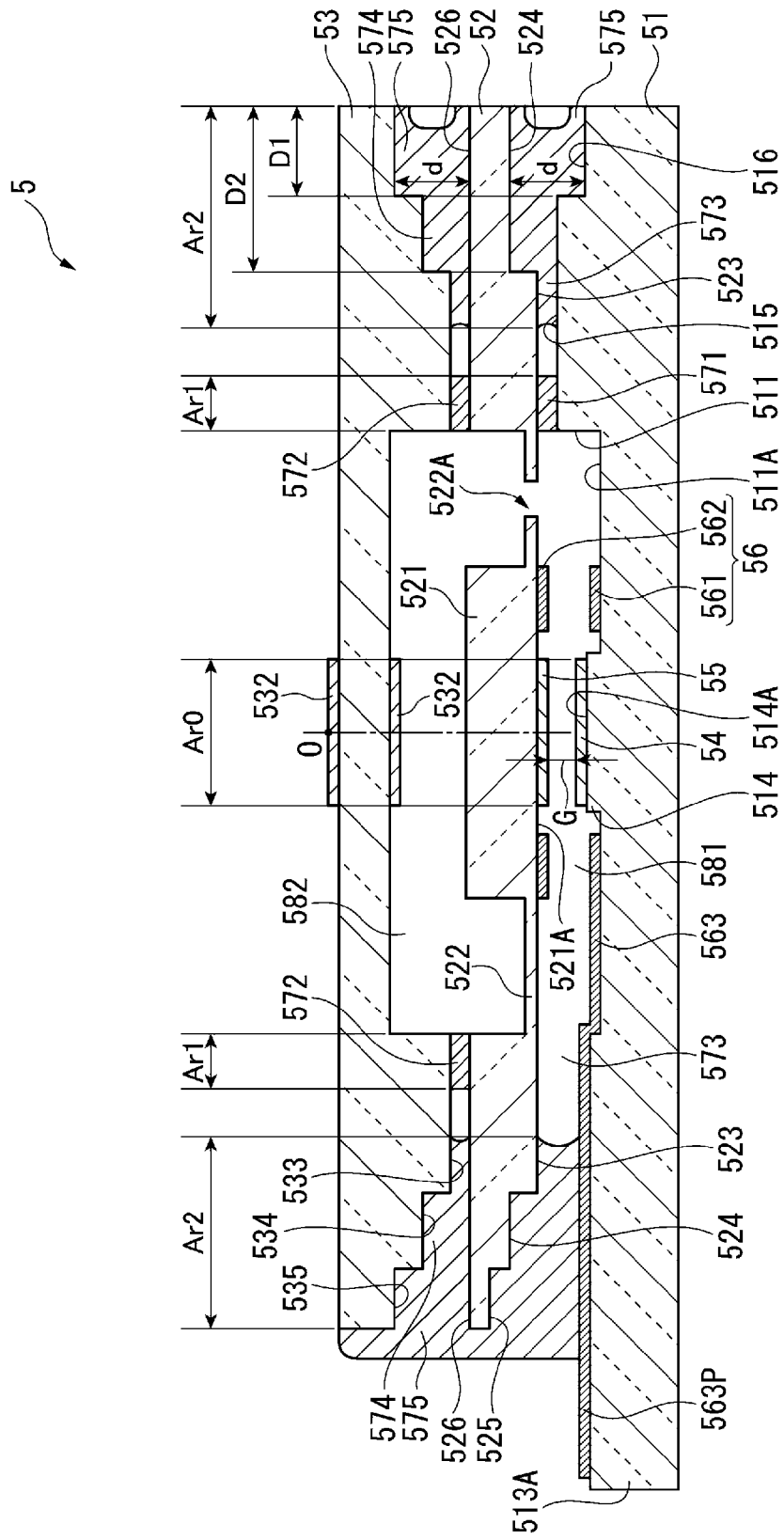
FIG. 3 is a cross-sectional view of the wavelength tunable interference filter taken along the line III-III' in FIG. 2.
Figure 4:
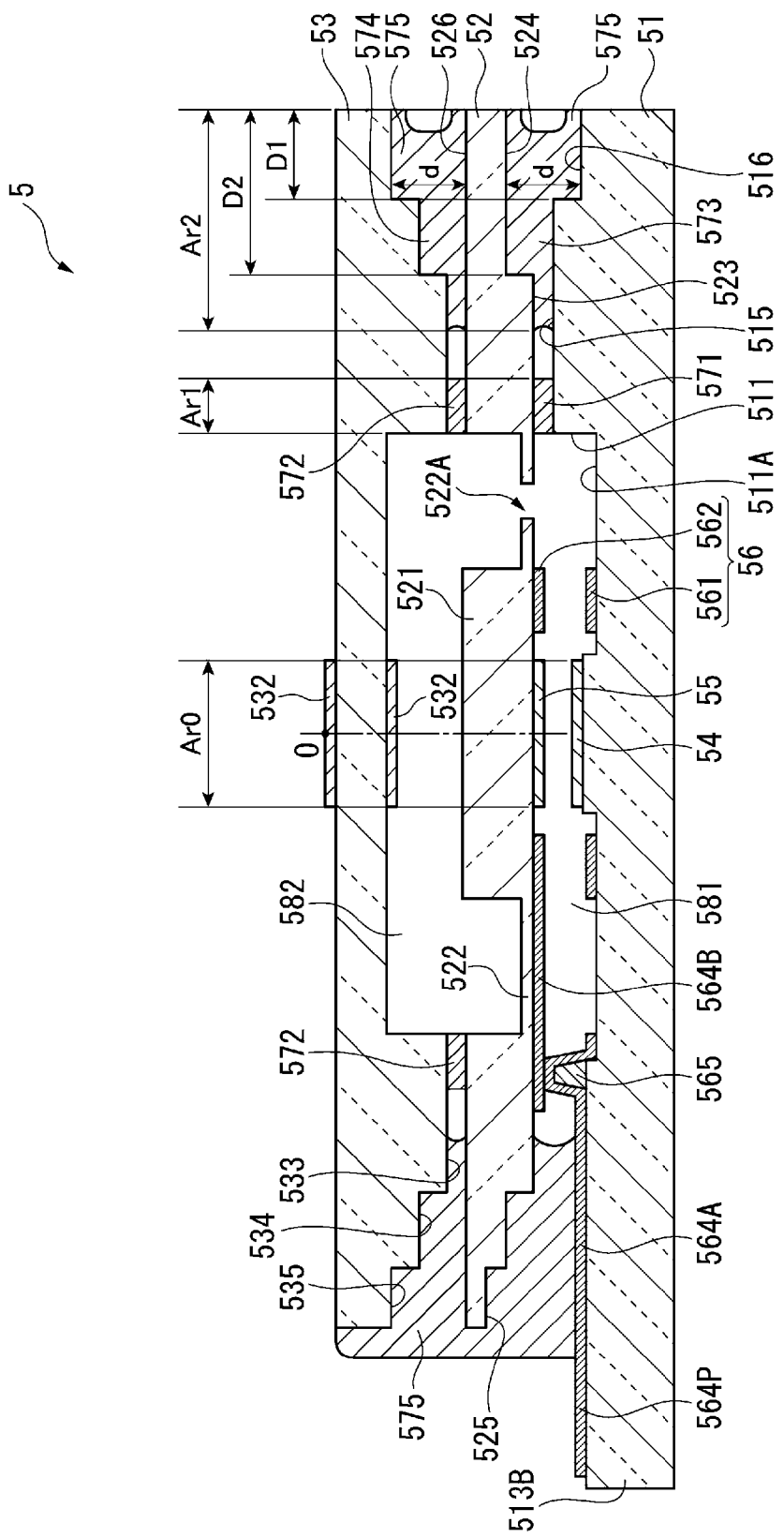
FIG. 4 is a cross-sectional view of the wavelength tunable interference filter taken along the line IV-IV' in FIG. 2.

In the optical module 10, light under measurement is guided through an optical system for incident light (not shown) to the wavelength tunable interference filter 5, which transmits light of a predetermined wavelength out of the light under measurement, and the detector 11 receives the transmitted light. A detection signal from the detector 11 is outputted via the I-V converter 12, the amplifier 13, and the A/D converter 14 to the control unit 20.
Configuration of Wavelength Tunable Interference Filter FIG. 2 is a plan view showing a schematic configuration of the wavelength tunable interference filter 5. FIG. 3 is a cross-sectional view showing a schematic configuration of the wavelength tunable interference filter 5 taken along the line III-III' in FIG. 2. FIG. 4 is a cross-sectional view showing a schematic configuration of the wavelength tunable interference filter 5 taken along the line IV-IV' in FIG. 2.

The wavelength tunable interference filter 5 is an optical member having a square plate shape in a plan view, as shown in FIGS. 2 to 4. The wavelength tunable interference filter 5 includes a first substrate 51, a second substrate 52, and a third substrate 53.

Each of the substrates 51, 52 and 53 is made, for example, of soda glass, crystalline glass, quartz glass, lead glass, potassium glass, borosilicate glass, no-alkali glass, or any of a variety of other glass materials, or quartz.

In the following description, a plan view viewed in the substrate thickness direction of the substrates 51, 52 and 53, that is, a plan view in which the wavelength tunable interference filter 5 is viewed in the direction in which the first substrate 51, the second substrate 52, and third substrate 53 are layered on each other is referred to as a filter plan view.

A pair of vertices of the first substrate 51 protrude from the second substrate 52 and the third substrate 53 in the filter plan view, and a first electrode drawing portion 513A is formed at each of the protruding vertices. Similarly, the other vertices of the first substrate 51 protrude from the second substrate 52 and the third substrate 53 in the filter plan view, and a second electrode drawing portion 513B is formed at each of the other protruding vertices.

Configuration of First Substrate

Figure 5:
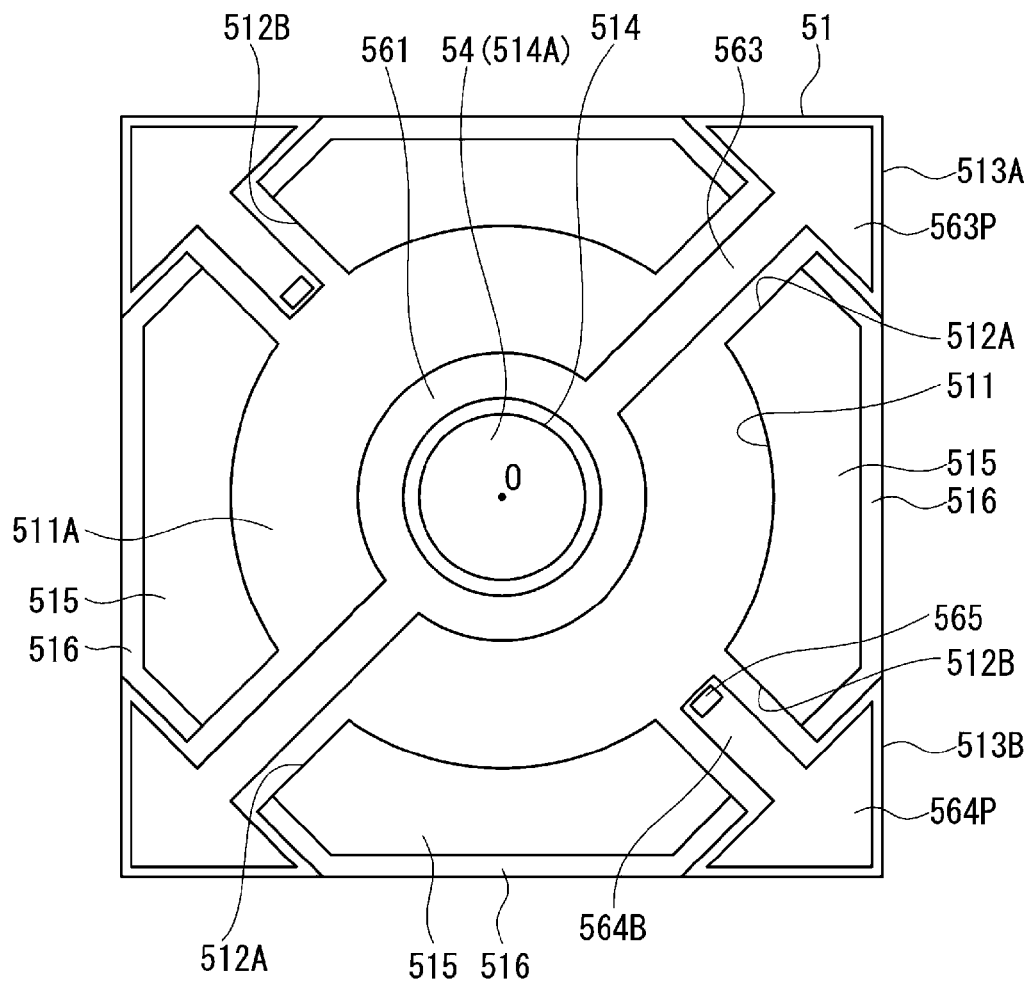
FIG. 5 is a plan view of a first substrate of the first embodiment viewed from the side where a second substrate is present.

FIG. 5 is a plan view of the first substrate 51 viewed from the side where the second substrate 52 is present.

The first substrate 51 has an electrode placement groove 511 and a reflection film attachment portion 514 formed therein, as shown in FIGS. 3 to 5. The first substrate 51 is formed to be thicker than the second substrate 52 and is therefore not bent by an electrostatic attractive force produced when a voltage is applied between a fixed electrode 561 and a movable electrode 562, which form an electrostatic actuator 56, or internal stress produced in the fixed electrode 561.

The reflection film attachment portion 514 is so formed that it has a substantially cylindrical shape around a plan-view center point O of the wavelength tunable interference filter 5 in the filter plan view and protrudes in the thickness direction of the substrate. The front end surface of the thus protruding reflection film attachment portion 514 forms a reflection film attachment surface 514A, on which a fixed reflection film 54 is disposed.

The reflection film attachment portion 514 is so formed that it protrudes from a central portion of the electrode placement groove 511 in the plan view described above toward the second substrate 52.

The electrode placement groove 511 is so formed that it has an annular shape formed around the plan-view center point O of the wavelength tunable interference filter 5 in the filter plan view and having a diameter greater than that of the reflection film attachment portion 514. A groove bottom surface of the electrode placement groove 511 forms an electrode attachment surface 511A, on which the fixed electrode 561 is disposed.

Further, a first electrode drawing groove 512A, which extends from the electrode placement groove 511 toward each of the first electrode drawing portions 513A, and a second electrode drawing groove 512B, which extends from the electrode placement groove 511 toward each of the second electrode drawing portions 513B, are provided in the first substrate 51.

The fixed electrode 561 is provided on the electrode attachment surface 511A of the electrode placement groove 511. The fixed electrode 561 provided on the electrode attachment surface 511A is disposed in an area facing the movable electrode 562 on a movable portion 521, which will be described later.

A fixed drawn electrode 563 is provided on the first substrate 51 and extends from the outer circumferential edge of the fixed electrode 561 along each of the first electrode drawing grooves 512A to the corresponding first electrode drawing portion 513A. A front end portion of the thus extending fixed drawn electrode 563 forms a fixed electrode pad 563P on the first electrode drawing portion 513A.

The present embodiment has a configuration in which the single fixed electrode 561 is provided on the electrode attachment surface 511A but may instead have, for example, a configuration in which two concentric electrodes formed around the plan-view center point O are provided on the electrode attachment surface 511A (dual electrode configuration).

On each of the second electrode drawing grooves 512B are provided a first movable drawn electrode 564A and a bump electrode 565, which electrically connects the movable electrode, which will be described later, to the first movable drawn electrode 564A. The bump electrode 565 is formed, for example, by plating gold or any other metal on a portion around a core made of a polyimide or any other resin.

A front end portion of each of the extending first movable drawn electrodes 564A forms a movable electrode pad 564P on the corresponding second electrode drawing portion 513B.

Part of the surface of the first substrate 51 that faces the second substrate 52, specifically, a surface other than the surface where the electrode placement groove 511, the electrode drawing grooves 512A and 512B, the electrode drawing portions 513A and 513B, and the reflection film attachment portion 514 are formed forms a first flat surface portion 515 and a second flat surface portion 516.

The first flat surface portion 515 has an inner edge formed along the electrode placement groove 511 in the filter plan view.

The second flat surface portion 516 is a flat surface that has an octagonal outer edge and an inner edge separated from the outer edge by a predetermined distance D1 in the filter plan view but excludes the area where the electrode drawing portions 513A and 513B located at the vertices of the square substrate are formed. The portion of the substrate where the second flat surface portion 516 is formed is thinner than the portion of the substrate where the first flat surface portion 515 is formed, and a step is therefore present between the first flat surface portion 515 and the second flat surface portion 516.

Configuration of Second Substrate

Figure 6:
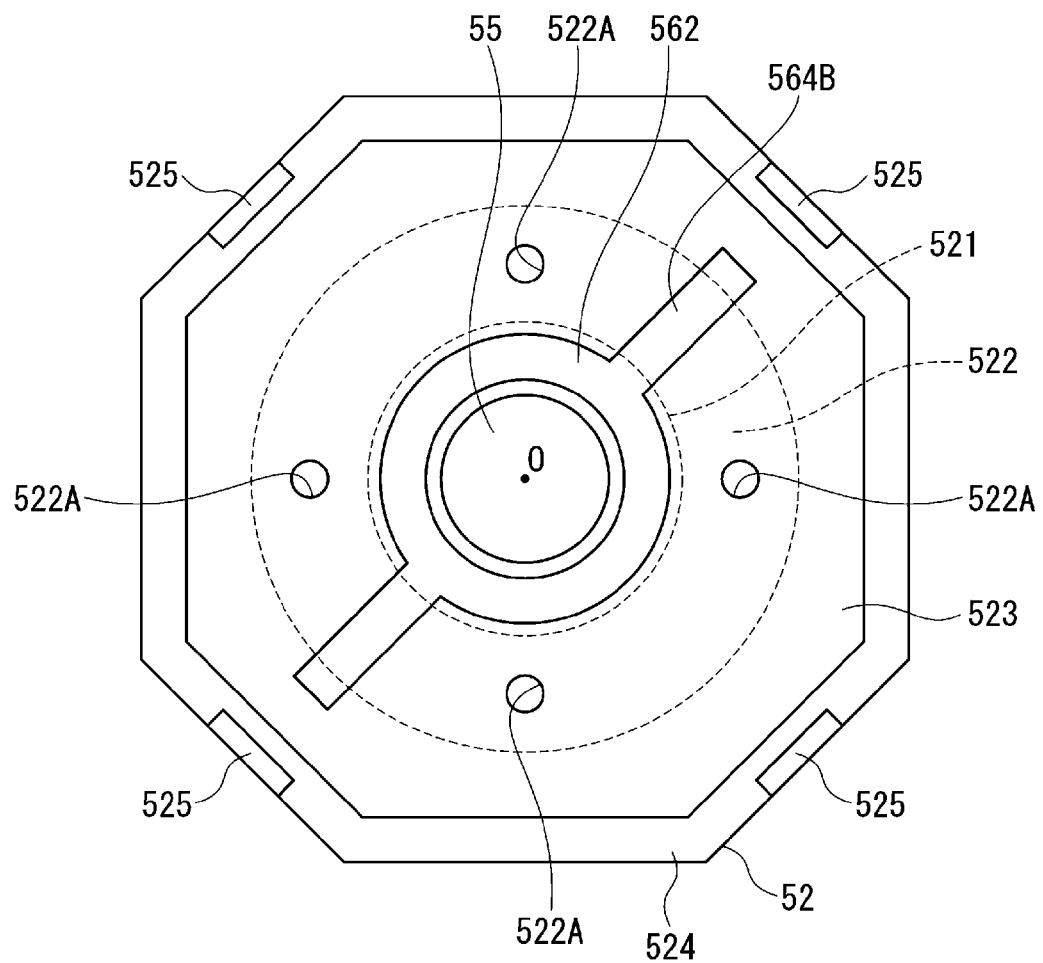
FIG. 6 is a plan view of the second substrate of the first embodiment viewed from the side where the first substrate is present.

FIG. 6 is a plan view of the second substrate 52 viewed from the side where the first substrate 51 is present.

The second substrate 52 has a movable portion 521, which has a circular shape around the plan-view center point O, and a holding portion 522, which is disposed in an area outside the movable portion 521 and holds the movable portion 521, in the filter plan view or FIG. 6.

Further, the second substrate 52 has cutouts formed in areas facing the first electrode drawing portions 513A and the second electrode drawing portions 513B, that is, in areas corresponding to the four vertices of the square shape from which the second substrate 52 is formed. The second substrate 52 therefore has an octagonal outer shape in the filter plan view.

The movable portion 521 is formed to be thicker than the holding portion 522. The movable portion 521 is so formed that it has a diameter greater than at least the diameter of the outer circumferential edge of the reflection film attachment surface 514A in the filter plan view. The movable electrode 562 and a movable reflection film 55, which is the second reflection film according to an embodiment of the invention, are disposed on the movable portion 521.

The movable reflection film 55 is so disposed on a central portion of a movable surface 521A of the movable portion 521 that the movable reflection film 55 faces the fixed reflection film 54 via an inter-reflection-film gap G1.

The holding portion 522 is a diaphragm that surrounds the movable portion 521 and is formed to be thinner than the movable portion 521. The thus configured holding portion 522 is more readily bent than the movable portion 521 and can therefore displace the movable portion 521 toward the first substrate 51 under a small amount of electrostatic attractive force.

The holding portion 522 has through holes 522A formed in the substrate thickness direction, and the through holes 522A allow the spaces created on both sides of the second substrate 52 to communicate with each other.

The movable electrode 562 is so formed that it faces the fixed electrode 561 and has the same annular shape as that of the fixed electrode 561.

Further, second movable drawn electrodes 564B are formed on the second substrate 52 and extend from the outer circumferential edge of the movable electrode 562 toward two vertices of the second substrate 52, specifically, two vertices facing the vertices of the first substrate 51 where the movable electrode pads 564P are provided. The second movable drawn electrodes 564B are so formed that they partially face the first movable drawn electrodes 564A. When the first substrate 51 and the second substrate 52 are bonded to each other, the bump electrodes 565 provided on the first substrate 51 come into contact with the second movable drawn electrodes 564B, whereby the movable electrode 562 is electrically connected to the movable electrode pads 564P.

Part of the surface of the second substrate 52 that faces the first substrate 51, specifically, the surface outside the holding portion 522 in the filter plan view forms a third flat surface portion 523, a fourth flat surface portion 524, and a fifth flat surface portion 525, as shown in FIGS. 3 and 4.

The third flat surface portion 523 has an inner edge formed along the area where the holding portion 522 is formed in the filter plan view.

The fourth flat surface portion 524 is a flat surface having an outer edge that coincides with the outer circumference of the octagonal second substrate 52 and an inner edge separated from the outer edge by a predetermined distance D2 in the filter plan view.

The fifth flat surface portion 525 is a flat surface formed in the areas of the fourth flat surface portion 524 that face the electrode drawing grooves 512A and 512B and having an inner edge separated from the outer edge described above by the predetermined distance D1.

The portion of the substrate where the fourth flat surface portion 524 is formed is thinner than the portion of the substrate where the third flat surface portion 523 is formed, and a step is therefore present between the third flat surface portion 523 and the fourth flat surface portion 524.

Similarly, the portion of the substrate where the fifth flat surface portion 525 is formed is thinner than the portion of the substrate where the fourth flat surface portion 524 is formed, and a step is therefore present between the fourth flat surface portion 524 and the fifth flat surface portion 525.

Configuration of Third Substrate

Figure 7:
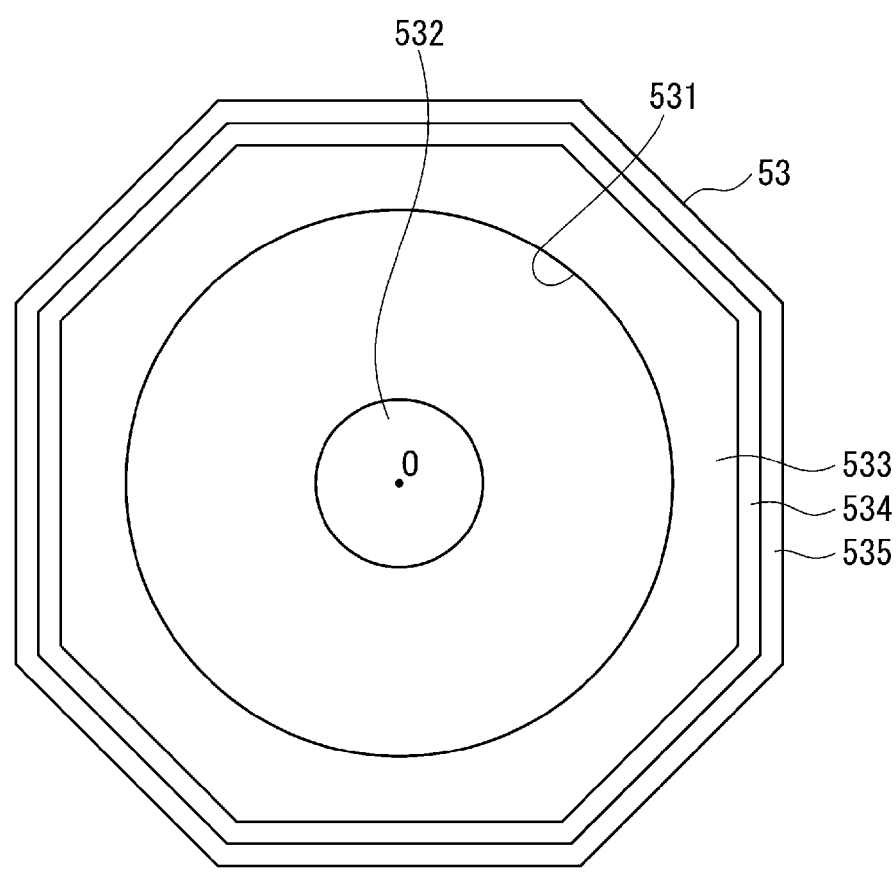
FIG. 7 is a plan view of a third substrate of the first embodiment viewed from the side where the second substrate is present.

FIG. 7 is a plan view of the third substrate 53 viewed from the side where the second substrate 52 is present.

The third substrate 53 has a gap formation groove 531 formed around the plan-view center point O in an area facing the holding portion 522 of the second substrate 52 in the filter plan view or FIG. 7, and the gap formation groove 531 has the same dimension as that of the holding portion 522.

Further, the third substrate 53 has cutouts formed in areas facing the first electrode drawing portions 513A and the second electrode drawing portions 513B, that is, in areas corresponding to the four vertices of the square shape from which the third substrate 53 is formed. The third substrate 53 therefore has an octagonal outer shape in the filter plan view.

Further, on each side of the third substrate 53 is provided an optical film 532 coaxially with the fixed reflection film 54 and the movable reflection film 55, and the optical film 532 reflects or absorbs light of wavelengths that do not fall within a predetermined range.

Part of the surface of the third substrate 53 that faces the second substrate 52, specifically, the surface outside the gap formation groove 531 in the filter plan view forms a sixth flat surface portion 533, a seventh flat surface portion 534, and an eighth flat surface portion 535, as shown in FIGS. 3 and 4.

The sixth flat surface portion 533 has an inner edge formed along the gap formation groove 531 in the filter plan view.

The seventh flat surface portion 534 has a flat surface having an inner edge separated from the octagonal outer edge of the third substrate 53 by the predetermined distance D2 and an outer edge separated therefrom by the predetermined distance D1 in the filter plan view.

The eighth flat surface portion 535 is a flat surface having an inner edge separated from the octagonal outer edge of the third substrate 53 by the predetermined distance D1 in the filter plan view.

The portion of the substrate where the seventh flat surface portion 534 is formed is thinner than the portion of the substrate where the sixth flat surface portion 533 is formed, and a step is therefore present between the sixth flat surface portion 533 and the seventh flat surface portion 534.

Similarly, the portion of the substrate where the eighth flat surface portion 535 is formed is thinner than the portion of the substrate where the seventh flat surface portion 534 is formed, and a step is therefore present between the seventh flat surface portion 534 and the eighth flat surface portion 535.

First Bonding Film, Second Bonding Film

The first substrate 51 and the second substrate 52 are bonded to each other via a first bonding film 571 disposed on the first flat surface portion 515 in an annular area (bonding area Ar1) along the area where the electrode placement groove 511 is formed (on third flat surface portion 523 in an annular area along the area where the holding portion 522 is formed) in the filter plan view.

The second substrate 52 and the third substrate 53 are bonded to each other via a second bonding film 572 disposed on an upper surface 526 of the second substrate 52 and the sixth flat surface portion 533 in an annular area (bonding area Ar1) along the holding portion 522 and the gap formation groove 531 in the filter plan view.

Each of the first bonding film 571 and the second bonding film 572 can, for example, be a plasma polymerization film primarily made, for example, of siloxane. The bonding films 571 and 572 correspond to the bonding portion according to an embodiment of the invention.

Sealer

The first substrate 51, the second substrate 52, and the third substrate 53 described above are bonded to each other in the bonding area Ar1 via the first bonding film 571 and the second bonding film 572, as shown in FIGS. 3 and 4.

As a result, interspaces are formed in the area which is outside the bonding area Ar1 in the filter plan view and where the substrates 51, 52, and 53 face each other. In each of the interspaces, the distance d between the substrates (hereinafter also referred to as inter-substrate distance d, see FIGS. 3 and 4) decreases in the direction from the outer circumference of the area toward an inner portion thereof. That is, a first interspace 573 is created between the first substrate 51 and the second substrate 52, and a second interspace 574 is created between the second substrate 52 and the third substrate 53. The interspaces 573 and 574 are sealed with a sealer 575, which corresponds to the sealing portion according to an embodiment of the invention. The wavelength tunable interference filter 5 is thus formed. The area where the interspaces 573 and 574 are created is called a sealing area Ar2.

The inter-substrate distance d is the distance between the opposing surfaces of the substrates 51, 52, and 53 facing each other or the distance between the substrates measured along the direction perpendicular to the reflection films 54 and 55.

The sealer 525 is made, for example, of a paraxylene-based polymer (parylene), such as parylene C, parylene N, parylene D, and parylene HT. The sealer 525 may instead be formed of an inorganic thin film made, for example, of $SiO_2$, SiN, or $Al_2O_3$ formed in a deposition process, such as, an atomic layer deposition (ALD) process or a chemical vapor deposition (CVD) process. The sealer 525 may still instead be made of an epoxy resin, a polyimide resin, polyethylene, polyethylene terephthalate, vinylidene chloride, polyvinyl alcohol, nylon, ethylene vinylalcohol, or any other resin.

Configurations of Detector, I-V Converter, Amplifier, A/D Converter, and Voltage Controller The detector 11 receives (detects) light having passed through a light interference area Ar0 where the reflection films 54 and 55 of the wavelength tunable interference filter 5 face each other and outputs a detection signal based on the amount of received light.

The I-V converter 12 converts the detection signal inputted from the detector 11 into a voltage value and outputs the voltage value to the amplifier 13.

The amplifier 13 amplifies the voltage according to the detection signal (detected voltage) inputted from the I-V converter 12.

The A/D converter 14 converts the detected voltage (analog signal) inputted from the amplifier 13 into a digital signal and outputs the digital signal to the control unit 20.

The voltage controller 15 applies a voltage to the electrostatic actuator 56 in the wavelength tunable interference filter 5 under the control of the control unit 20. As a result, an electrostatic attractive force is produced between the fixed electrode and the movable electrode of the electrostatic actuator 56 and displaces the movable portion 521 toward the first substrate 51. The dimension of the inter-reflection-film gap G1 is thus set at a predetermined value.

Configuration of Control Unit

Referring back to FIG. 1, the control unit 20 in the spectroscopic measurement apparatus 1 will be described.

The control unit 20 is, for example, a combination of a CPU, a memory, and other components and controls the overall action of the spectroscopic measurement apparatus 1. The control unit 20 includes a filter drive section, a light amount acquisition section 22, and a spectroscopic measurement section 23, as shown in FIG. 1.

The control unit 20 further includes a storage section 30, which stores a variety of data. The storage section 30 specifically stores V-λ data representing a drive voltage applied to the electrostatic actuator 56 in the wavelength tunable interference filter 5 versus the wavelength of light allowed to pass through the wavelength tunable interference filter 5 when the drive voltage is applied.

The filter drive section sets a drive voltage (target voltage) for setting the wavelength of light to be extracted through the wavelength tunable interference filter 5 and outputs a voltage indication signal according to the thus set target voltage to the voltage controller 15.

Specifically, the filter drive section reads a drive voltage corresponding to a target wavelength under measurement from the V-λ data stored in the storage section 30 and applies the read drive voltage to the electrostatic actuator 56.

The light amount acquisition section 22 acquires the amount of light of the target wavelength having passed through the wavelength tunable interference filter 5 based on the amount of light acquired with the detector 11.

The spectroscopic measurement section 23 measures spectral characteristics of the light under measurement based on the amount of light acquired by the light amount acquisition section 22.

Method for Manufacturing Wavelength Tunable Interference Filter

A method for manufacturing the wavelength tunable interference filter 5 will next be described.

The substrates 51, 52, and 53 described above are first formed. Each of the first substrate 51 and the third substrate 53 is formed to a thickness that ensures that the substrate is rigid enough not to be bent when the pressure in a first internal space 581 and a second internal space 582 is lowered.

The substrates 51, 52, and 53 are then bonded to each other. Each of the bonding films 571 and 572 is, for example, a plasma polymerization film. Specifically, plasma polymerization films are formed in the bonding area Ar1 between the substrates 51, 52, and 53, for example, in a plasma polymerization process. After the plasma polymerization films are irradiated with UV light or processed by using plasma, the substrates 51, 52, and 53 are layered on each other so that the substrates 51, 52, and 53 are bonded to each other. It is preferable that the plasma polymerization films are primarily made of polyorganosiloxane, and that the average thickness of each of the films ranges, for example, from about 10 to 1000 nm.

The plasma polymerization films made of siloxane described above can be readily bonded to the substrates irrespective of temperature in an activated bonding process.

Further, the plasma polymerizations film made of siloxan provide satisfactory bonding strength even when each of the substrates 51, 52, and 53 to be bonded to each other is made of an arbitrary material and the surface of each of the substrates 51, 52, and 53 is not satisfactorily flat.

The substrates 51, 52, and 53 may be bonded to each other, for example, by using a bonding method using an adherent thin film (adhesive) or a bonding method using a metal film as well as the bonding method described above.

Sealing Step and Chip Forming Step

FIGS. 8A to 8E show a sealing step and a chip forming step after the substrates 51, 52, and 53 are bonded to each other. In the following sections, a description will be made of a manufacturing method including forming each of the substrates 51, 52, and 53 by using a single base, bonding the bases to each other, and finally separating the bonded structure into individual wavelength tunable interference filters 5.

Figure 8A:
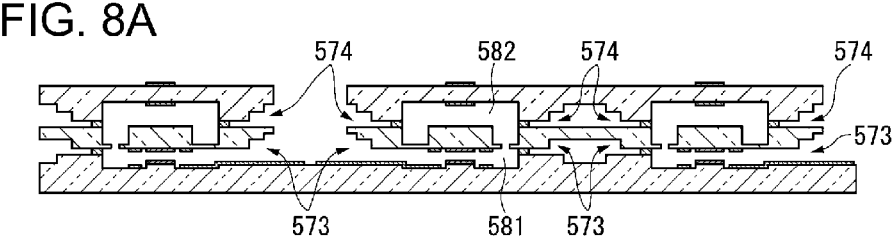
FIGS. 8A to 8E show a sealing step in a manufacturing process in the first embodiment.
Figure 8B:
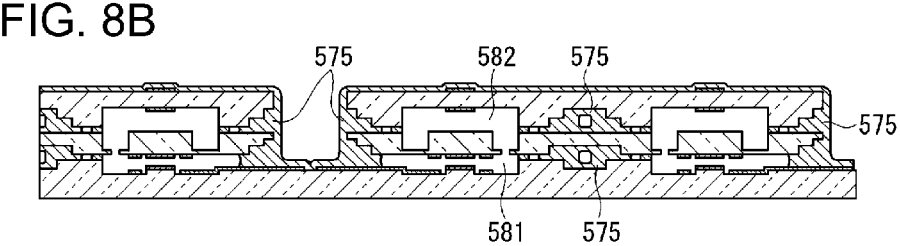

FIG. 8A shows a state in which the substrates 51, 52, and 53 have been bonded to each other. After the substrates 51, 52, and 53 are bonded to each other, the pressure in the first internal space 581 and the second internal space 582 is lowered to a value smaller than the atmospheric pressure. With the pressure in the first internal space 581 and the second internal space 582 lowered (to produce a vacuum, for example), the first interspace 573 and the second interspace 574 are sealed with the sealer 575 (see FIG. 8B).

The sealer 575 is made, for example, of a paraxylene-based polymer (parylene). Specifically, a parylene monomer gas is introduced into a vacuum chamber in which the bonded substrates 51, 52, and 53 are disposed to form a uniform parylene thin film on the surfaces of the bonded substrates 51, 52, and 53 at room temperature.

Parylene enters a minute interspace. The parylene therefore also enters the first interspace 573 and the second interspace 574 and is deposited therein to form the sealer 575. The first interspace 573 and the second interspace 574 are thus sealed.

Figure 8C:
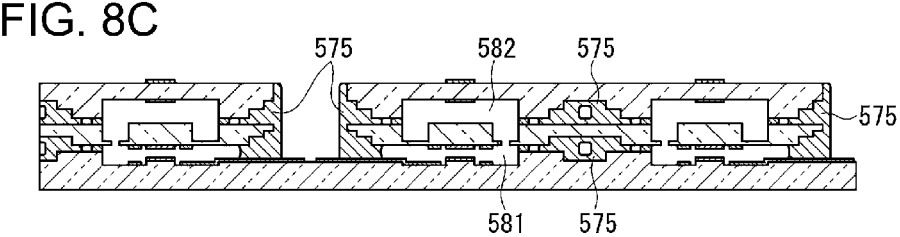

After the sealer 575 seals the interspaces, reactive ion etching (RIE) or any other plasma processing is performed for anisotropic etching in the substrate thickness direction to remove the sealer 575 deposited on the upper surface of the third substrate 53 and part of the sealer 575 that covers the entire fixed electrode pads 563P and movable electrode pads 564P (see FIG. 8C). For example, when the sealer 575 is made of parylene, $O_2$-gas-based plasma processing is performed.

Figure 8D:
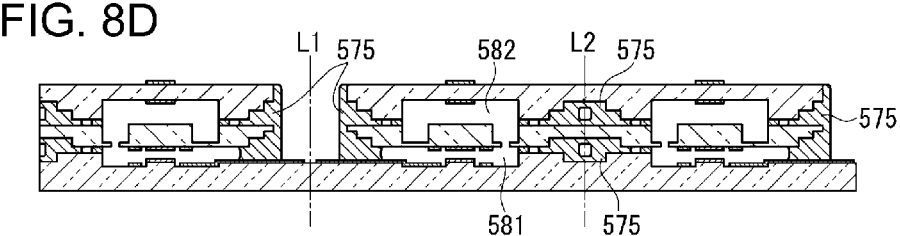
Figure 8E:
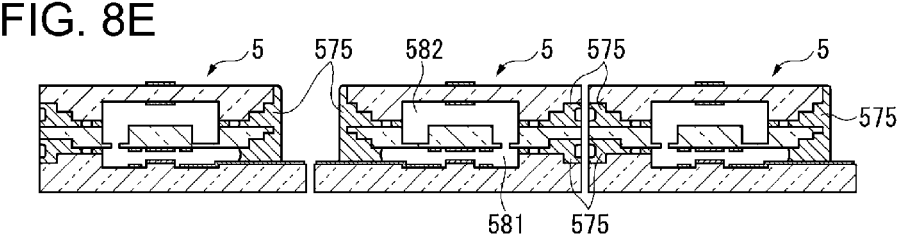

The resultant structure is then cut along cutting lines L1 and L2 indicated by the broken lines in FIG. 8D into individual pieces. A plurality of wavelength tunable interference filters 5 are thus formed (see FIG. 8E).

Advantageous Effects of First Embodiment

In the present embodiment, the first substrate 51 and the second substrate 52 form the first interspace 573, in which the inter-substrate distance d decreases in the direction from the outer circumferential edges of the substrates toward an inner portion of the interspace. The first bonding film 571 is disposed in an area inside the first interspace 573 in the filter plan view and bonds the substrates 51 and 52 to each other, and the first interspace 573 is sealed with the sealer 575.

The bonding and the sealing can therefore be performed by using different materials and methods. The first bonding film 571 therefore has nothing to do with the sealing performance but provides desired bonding strength. On the other hand, the sealing by using the sealer 575 has nothing to do with the bonding strength but allows selection of a material and a method that provide desired sealing performance. Both the bonding strength and the sealing performance can therefore be readily improved.

Further, since the bonding is followed by the sealing, the bonding method can be freely selected. For example, the bonding can be performed under the atmospheric pressure. In this case, the bonding step can be simplified.

The first substrate 51 and the second substrate 52 form the first interspace 573, in which the distance d between the substrates decreases in the direction from the outer circumferential edges of the substrates toward an inner portion of the interspace in the filter plan view. In the present embodiment, in particular, the first interspace 573 is formed of a plurality of steps.

The sealer 575 can therefore be deposited in a deep portion inside the interspace. As a result, the sealed distance can be increased, whereby the sealing performance can be improved.

That is, in the case where the material of the sealer 575, which fills the internal space of the vacuum chamber, is deposited in an evaporation process as in the present embodiment, the sealing distance depends on the dimension (height) of the interspace in the substrate thickness direction. That is, when the height is large, the sealing distance increases, whereas when the height is small, the sealing distance decreases.

Providing a plurality of steps in an area outside the bonding area Ar1 therefore allows the sealer 575 to be deposited in a deeper portion than in a case where an interspace that is as high as the bonding area Ar1 is simply provided, whereby the sealing distance can be increased. The sealing performance can therefore be improved.

Further, in the wavelength tunable interference filter 5 having the sealing structure described above, in which the bonding and the sealing are achieved by using different members, materials and methods appropriate for the two purposes are readily selected.

That is, the bonding method needs to not only, of course, provide appropriate bonding strength but also allow the substrates to be bonded to each other in parallel to each other with an appropriate distance (design value) therebetween. A usable method is therefore limited, and the limitation makes it difficult to also achieve satisfactory sealing performance. In contrast, in the present embodiment, the sealing area Ar2, in which the inter-substrate distance d decreases in the direction from an outer portion to an inner portion of the sealing area Ar2, is provided in an area outside the bonding area Ar1, and the sealing area Ar2 is sealed, whereby both the bonding strength and the sealing performance can be readily improved.

In the present embodiment, the bonding area Ar1 and the sealing area Ar2 are similarly provided between the second substrate 52 and the third substrate 53, and providing the sealing structure described above between the second substrate 52 and the third substrate 53 also readily allows both the bonding strength and the sealing performance to be improved between the second substrate 52 and the third substrate 53.

Further, in the present embodiment, since the sealing performance can be improved, contamination of the first internal space 581 and the second internal space 582 due to external foreign matter can be suppressed, whereby degradation of the electrostatic actuator 56 and the reflection films 54 and 55 due to environmental factors can be suppressed. Degradation of the drive and optical characteristics of the wavelength tunable interference filter 5 can therefore be suppressed, whereby the reliability of the wavelength tunable interference filter 5 can be maintained for a long period.

Moreover, the optical module 10 and the spectroscopic measurement apparatus 1, in which the thus configured wavelength tunable interference filter 5 is provided, allow high-precision measurement for a long period.

In the present embodiment, using a paraxylene-based polymer (parylene) as the sealer 575 allows improvement in the sealing performance and efficient manufacture of the high-performance wavelength tunable interference filter 5.

That is, parylene can be deposited in a minute interspace, and the sealing material can therefore be deposited in a deep portion of the interspace. The sealing distance can therefore be increased, whereby the sealing performance can be improved.

Further, since parylene can be deposited at room temperature, adverse effects of heat on the wavelength tunable interference filter 5, that is, generation of stress due to thermal expansion, degradation of the mirrors, and other undesirable phenomena can be suppressed, whereby the high-performance wavelength tunable interference filter 5 can be manufactured.

Moreover, to form a plurality of wavelength tunable interference filters 5 over a large substrate and separate the substrate into a plurality of individual wavelength tunable interference filters 5 in a manufacturing process, the interspaces in the wavelength tunable interference filters 5 can be sealed in a single step, whereby the manufacturing efficiency can be improved.

It is noted that since parylene C, in particular, serves as an excellent gas barrier, using parylene C as the sealing material further improves the sealing performance.

The sealer 575 is not necessarily made of parylene and may instead be formed in an ALD or CVD process. Examples of the sealer 575 formed in an ALD or CVD process include inorganic thin films made, for example, of $SiO_2$, SiN, and $Al_2O_3$.

Depositing the sealer 575 in an ALD or CVD process as described above allows the interspaces in a plurality of wavelength tunable interference filters 5 to be sealed in a single step as described above, whereby the manufacturing efficiency can be improved.

In the present embodiment, a plasma polymerization film is used as each of the bonding films. In the procedure of manufacturing the substrates 51, 52, and 53, even when a plurality of processing steps cause the surface precision of the bonding surfaces of the substrates to deteriorate, a plasma polymerization film can smooth the irregularities of the surfaces. As a result, the substrates 51, 52, and 53 can be bonded to each other without extra surface smoothing.

Further, in the present embodiment, the holding portion 522 has the through holes 522A, which allow the first internal space 581 and the second internal space 582 to communicate with each other.

The through holes 522A can make the pressure in the first internal space 581 and the second internal space 582 uniform. Any change in external force acting on the movable reflection film 55 resulting from a difference in the pressure between the internal spaces can be suppressed, whereby the movable reflection film 55 can be moved with high precision.

Further, in the optical module 10 and the spectroscopic measurement apparatus 1 using the wavelength tunable interference filter 5, the movable reflection film 55 in the wavelength tunable interference filter 5 can be moved with high precision, whereby light under measurement can be separated and detected with high precision for high precision analysis of the light under measurement.

Moreover, in the present embodiment, the internal pressure in the internal space 581 and the second internal space 582 is lower than the atmospheric pressure. Lowering the pressure in the first internal space 581 and the second internal space 582 as described above provides satisfactory response of the movable portion 521.

Second Embodiment

A second embodiment according to the invention will next be described with reference to the drawings.

Figure 9:
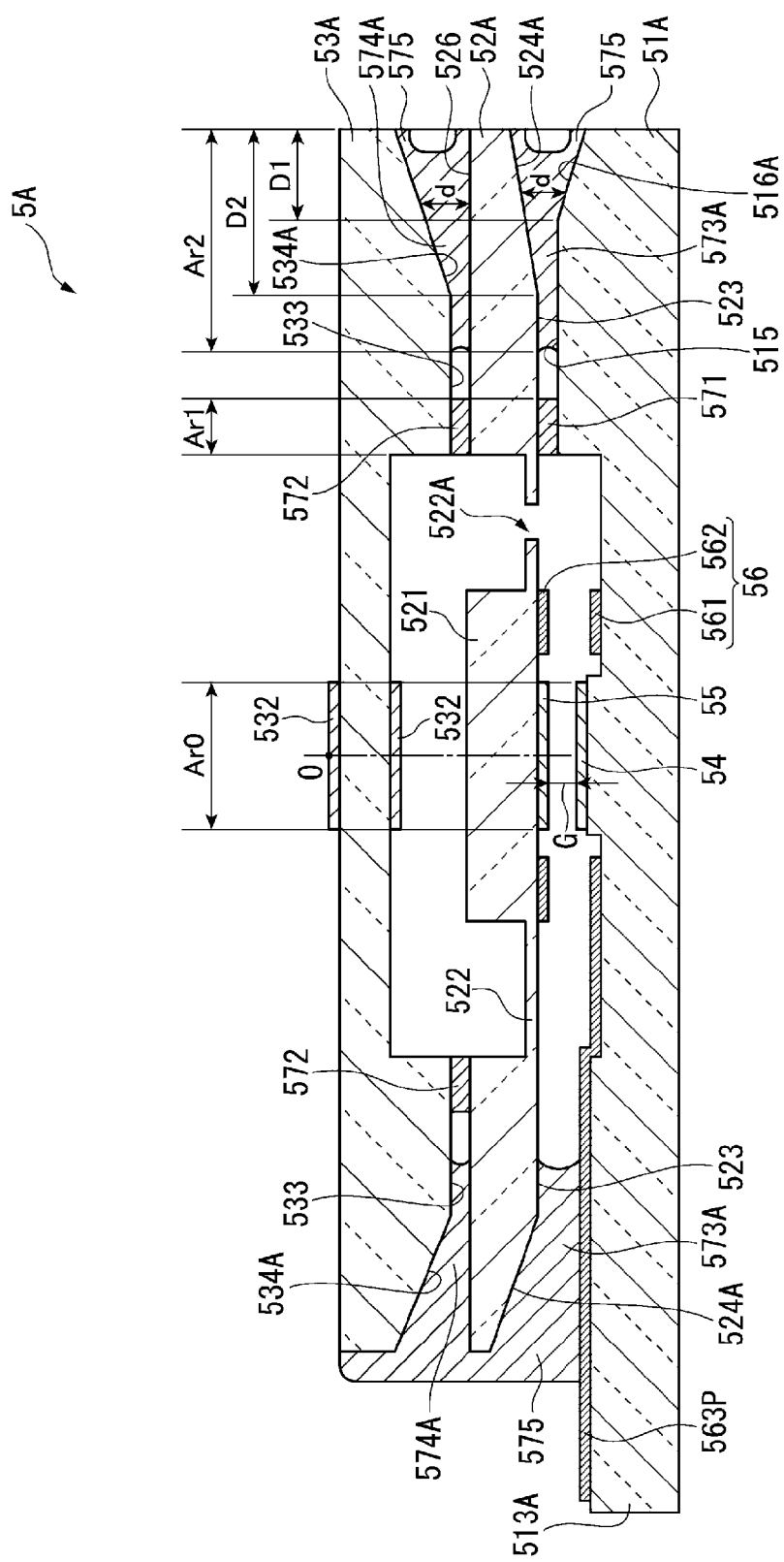
FIG. 9 is a cross-sectional view showing a schematic configuration of a wavelength tunable interference filter of a second embodiment.

FIG. 9 is a cross-sectional view showing a schematic configuration of a wavelength tunable interference filter 5A of the second embodiment according to the invention. In the following description, the same components as those in the first embodiment have the same reference characters and descriptions thereof will be omitted or simplified.

The wavelength tunable interference filter 5 of the first embodiment described above has, in the bonding area Ar2, the first interspace 573 and the second interspace 574, each of which is formed of a plurality of steps and in each of which the inter-substrate distance d decreases in the direction from the outer circumferential edge of the substrates toward an inner portion of the interspace.

In contrast, the wavelength tunable interference filter 5A of the present embodiment has a first interspace 573A and a second interspace 574A, each of which is formed of an inclined surface.

Configuration of Wavelength Tunable Interference Filter

The wavelength tunable interference filter 5A includes a first substrate 51A, a second substrate 52A, and a third substrate 53A, as shown in FIG. 9.

Part of the surface of the first substrate 51A that faces the second substrate 52A, specifically, a surface other than the surface where the electrode placement groove 511, the reflection film attachment portion 514, the electrode drawing grooves 512A and 512B, and the electrode drawing portions 513A and 513B are formed forms a first flat surface portion 515 and a first inclined portion 516A.

The first flat surface portion 515 has an inner edge formed along the electrode placement groove 511 in the filter plan view.

The first inclined portion 516A has an inclined surface having an outer edge that coincides with the octagonal circumference of the substrate and so inclined that the thickness of the first substrate 51A increases from the outer edge toward a position separated therefrom by a predetermined distance D1 in the filter plan view.

Part of the surface of the second substrate 52A that faces the first substrate 51A, specifically, the surface outside the holding portion 522 in the filter plan view forms a third flat surface portion 523 and a second inclined portion 524A.

The second inclined portion 524A has an inclined surface having an outer edge that coincides with the octagonal outer circumference of the substrate and so inclined that the thickness of the second substrate 52A increases from the outer edge toward a position separated therefrom by a predetermined distance D2 in the filter plan view.

Part of the surface of the third substrate 53A that faces the second substrate 52A, specifically, the surface outside the gap formation groove 531 in the filter plan view forms a sixth flat surface portion 533 and a third inclined portion 534A.

The sixth flat surface portion 533 has an inner edge formed along the gap formation groove 531 in the filter plan view.

The third inclined portion 534A has an inclined surface having an outer edge that coincides with the outer circumference of the octagonal third substrate 53A and so inclined that the thickness of the third substrate 53A increases from the outer edge toward a position separated therefrom by the predetermined distance D2 in the filter plan view.

The first substrate 51A, the second substrate 52A, and the third substrate 53A are bonded to each other in the bonding area Ar1 via the first bonding film 571 and the second bonding film 572, as in the first embodiment.

Further, the area outside the bonding area Ar1 in the filter plan view forms a sealing area Ar2, in which the inter-substrate distance d decreases in the direction from the outer circumference of the area where the substrates 51A, 52A, and 53A face each other toward an inner portion of the area.

That is, a first interspace 573A is formed between the first substrate 51A and the second substrate 52A, and a second interspace 574A is formed between the second substrate 52A and the third substrate 53A. The interspaces 573A and 574A are sealed with the sealer 575. The wavelength tunable interference filter 5A is thus formed.

The thus configured wavelength tunable interference filter 5A is also manufactured in the same manner as the wavelength tunable interference filter 5 of the first embodiment.

Advantageous Effects of Second Embodiment

In the present embodiment, as in the first embodiment, the sealing area Ar2, in which the inter-substrate distance d decreases in the direction from the outer circumferential edge of the substrates toward an inner portion of the sealing area in the filter plan view, is formed and sealed with the sealer 575. Both the bonding strength and the sealing performance can therefore be readily improved.

In the present embodiment, in particular, since the sealing area Ar2 is formed of the first inclined portion 516A, the second inclined portion 524A, and the third inclined portion 534A, the inter-substrate distance d can be continuously changed. As a result, the sealer 575 can be formed in a deeper portion in each of the first interspace 573A and the second interspace 574A, whereby the sealing distance can be further increased and hence the sealing performance can be improved.

Variations of Embodiments

The invention is not limited to the embodiments described above, and variations, improvements, and other modifications fall within the scope of the invention to the extent that they can achieve the advantage of the invention.

For example, in the embodiments described above, the wavelength tunable interference filters 5 and 5A, in which the movable reflection film 55 is provided on the second substrates 52 and 52A, are presented by way of example, but the structure described above is not necessarily employed. The invention is not limited to the configuration in which a reflection film is provided on each of a pair of substrates and may be applied to a Fabry-Perot etalon in which a pair of reflection films facing each other are provided on a single substrate.

Figure 10:
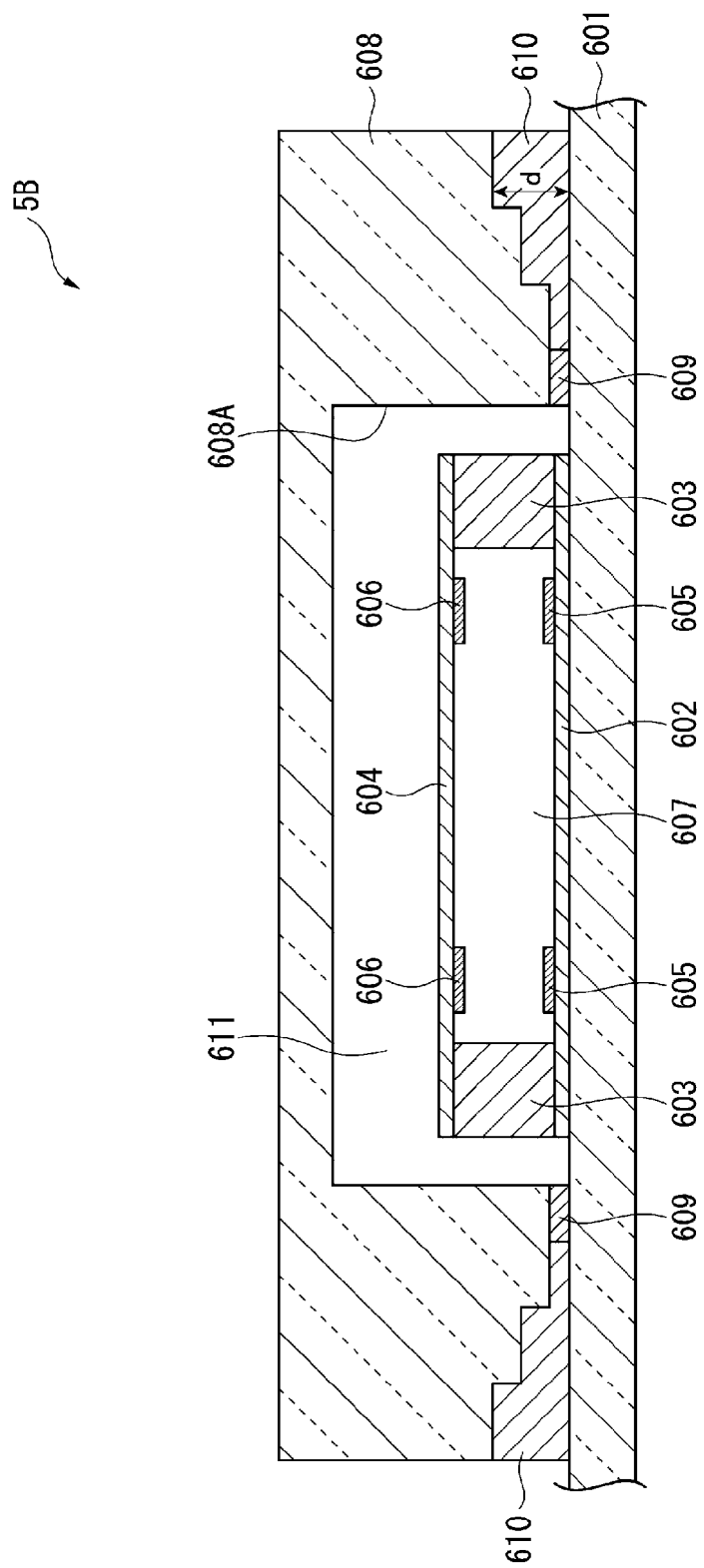
FIG. 10 is a cross-sectional view showing a schematic configuration of a variation of any of the wavelength tunable interference filters.

FIG. 10 is a cross-sectional view showing a schematic configuration of a wavelength tunable interference filter 5B, which a variation of the invention.

A fixed reflection film 602 is provided on a first substrate 601, as shown in FIG. 10. A sacrifice layer 603 is provided on the fixed reflection film 602, and a movable reflection film 604 is provided on and supported by the sacrifice layer 603. A through hole (not shown) that allows spaces on both sides of the movable reflection film 604 to communicate with each other is provided through the movable reflection film 604.

A fixed electrode 605 is provided on the fixed reflection film 602, and a movable electrode 606 is provided on the movable reflection film 604 in an area facing the fixed electrode 605.

The structure described above is formed by sequentially forming the fixed reflection film 602 and the fixed electrode 605 on the first substrate 601, then forming the sacrifice layer on the resultant structure, and sequentially forming the movable electrode 606 and the movable reflection film 604 on the sacrifice layer. Part of the sacrifice layer is then etched away or otherwise removed to form the sacrifice layer 603 that supports the movable reflection film 604 and maintains the gap between the reflection films. The sacrifice layer 603 functions as a spacer for forming a space 607 between the fixed reflection film 602 and the movable reflection film 604.

The space 607, that is, the gap between the reflection films is formed by removing part of the sacrifice layer.

A Fabry-Perot etalon in which the fixed reflection film 602 and the movable reflection film 604 face each other is thus formed.

Further, a second substrate 608 is disposed on the first substrate 601 and covers the fixed reflection film 602 and the movable reflection film 604, as shown in FIG. 10.

The second substrate 608 has a gap formation groove 608A formed therein, as in the case of the third substrate 53 in the first embodiment, and a bonding area is formed along the gap formation groove 608A. A bonding film 609 is provided in the bonding area and bonds the first substrate 601 and the second substrate 608 to each other.

Further, the second substrate 608 has a sealing area formed thereon in an area outside the bonding area, as the third substrate 53 of the first embodiment does. The sealing area is so formed that it has a plurality of steps and the inter-substrate distance d, which is the distance between the first substrate 601 and the second substrate 608, decreases from an outer portion toward an inner portion of the sealing area. A sealing material 610 is deposited on the sealing area and seals an internal space 611 formed by the gap formation groove 608A.

The thus configured wavelength tunable interference filter 5B can also provide the same advantageous effects as those provided in each of the embodiments described above.

The second substrate 608 has been described with reference to the configuration in which a plurality of steps form the sealing area as in the first embodiment, but the second substrate 608 does not necessarily have the configuration described above. The second substrate 608 may have a configuration in which an inclined portion forms the sealing area as in the second embodiment.

In each of the embodiments described above, the through holes 522A are provided in the holding portion 522 by way of example, but the invention is not necessarily configured this way. The through holes 522A only need to allow the first internal space 581 and the second internal space 582 to communicate with each other and may be provided, for example, in the movable portion 521.

In each of the embodiment described above, the diaphragm-shaped holding portion 522 is presented by way of example, but the holding portion 522 is not necessarily formed of a diaphragm. For example, beam-shaped holding portions disposed at equal angular intervals may be provided around the plan-view center point O. In this case, the through holes 522A are not required.

In each of the embodiment described above, the configuration in which the pressure in the first internal space 581 and the second internal space 582 is lowered is presented by way of example, but the invention is not necessarily configured this way. For example, the first internal space 581 and the second internal space 582 may be filled with an inert gas or the pressure in the first internal space 581 and the second internal space 582 may be equal to or higher than the atmospheric pressure.

In each of the embodiments and the variations described above, the electrostatic actuator is presented as the gap changer according to an embodiment of the invention by way of example, but the gap changer is not limited to an electrostatic actuator. For example, the gap changer may be an electromagnetic actuator having a first electromagnetic induction coil provided in place of the fixed electrode 561 and a second electromagnetic induction coil or a permanent magnet provided in place of the movable electrode 562. The gap changer may instead be any driver capable of changing the inter-reflection-film gap G, such as a configuration in which a piezoelectric device is used to displace the movable portion 521 and a configuration in which the inter-reflection-film gap is changed based on air pressure.

In the embodiments and the variations described above, the wavelength tunable interference filters 5, 5A, and 5B, each of which is a wavelength tunable Fabry-Perot etalon, have been described, but the invention is not necessarily configured this way. That is, each of the wavelength tunable interference filters may be a wavelength-fixed Fabry-Perot etalon including no gap changer. In this case as well, the internal spaces can be preferably sealed, whereby degradation of the reflection films can be suppressed. In this case, no through hole that allows the spaces on both sides of the movable reflection film to communicate with each other is required.

In the embodiments and the variations described above, the sealing structures for sealing the spaces between the substrates in the wavelength tunable interference filters 5, 5A, and 5B have been described, but the invention is not necessarily configured this way. The invention may be applicable to a general sealing structure in which two substrates are bonded to each other and the space formed between the substrates is sealed.

In each of the embodiments described above, the spectroscopic measurement apparatus 1 is presented as the electronic apparatus according to an embodiment of the invention by way of example. The optical module and the electronic apparatus according to the embodiments of the invention are applicable to a variety of fields as well as the example described above.

Figure 11:
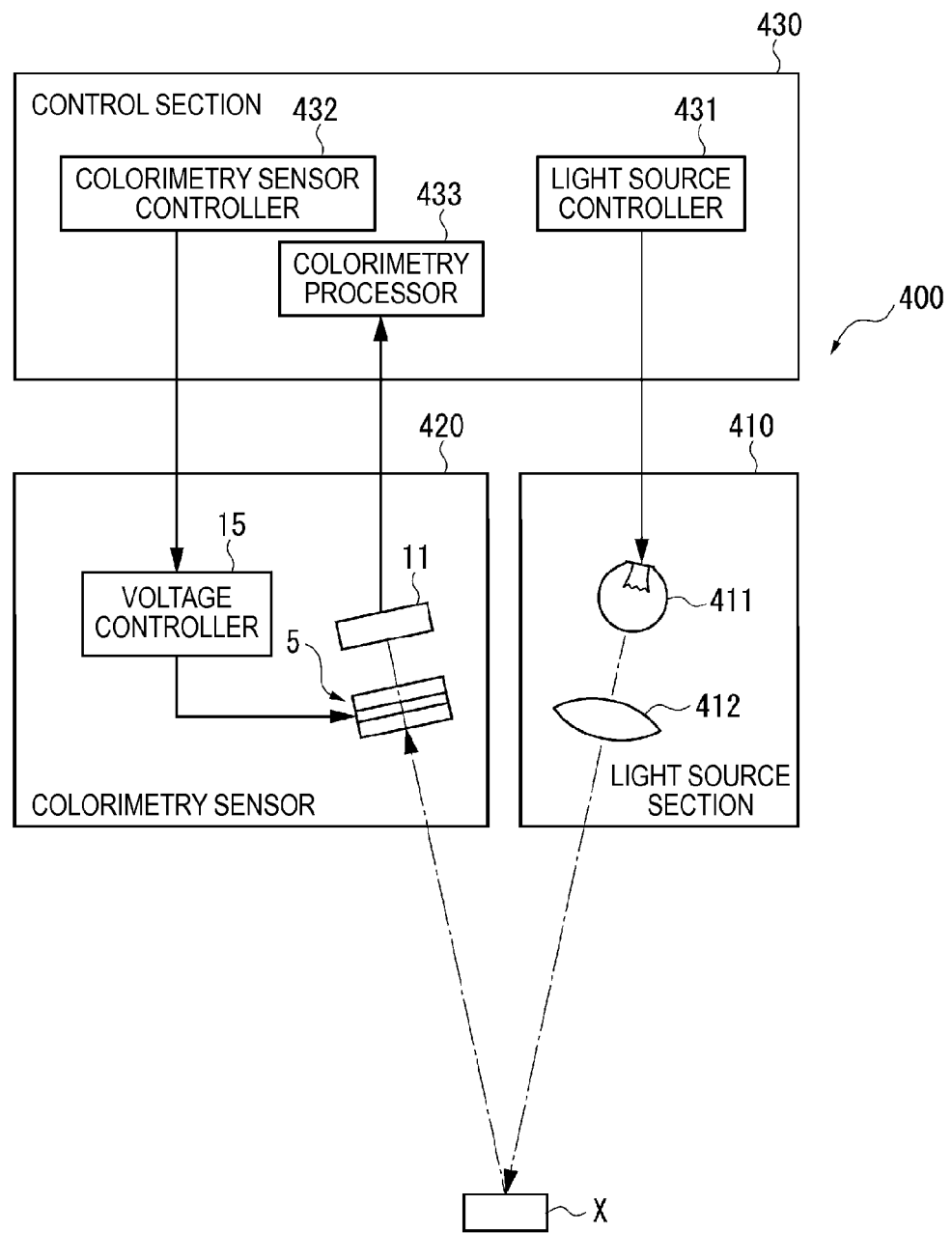
FIG. 11 shows a schematic configuration of a colorimetry apparatus (electronic apparatus) including any of the wavelength tunable interference filters according to the embodiments of the invention.

For example, the electronic apparatus according to the embodiment of the invention is applicable to a colorimetry apparatus for color measurement, as shown in FIG. 11.

FIG. 11 is a block diagram showing an example of a colorimetry apparatus 400 including a wavelength tunable interference filter.

The colorimetry apparatus 400 includes a light source section 410, which outputs light toward an object X under measurement, a colorimetry sensor 420 (optical module), and a control section 430, which controls overall action of the colorimetry apparatus 400, as shown in FIG. 11. The colorimetry apparatus 400 operates as follows: The light outputted from the light source section 410 is reflected off the object X under measurement; the colorimetry sensor 420 receives the reflected light under measurement; and the chromaticity of the light under measurement, that is, the color of the object X under measurement is analyzed and measured based on a detection signal outputted from the colorimetry sensor 420.

The light source section 410 includes alight source 411 and a plurality of lenses 412 (FIG. 11 shows only one of them) and outputs, for example, reference light (white light, for example) toward the object X under measurement. The plurality of lenses 412 may include a collimator lens. In this case, in the light source section 410, the collimator lens parallelizes the reference light emitted from the light source 411 and outputs the parallelized reference light through a projection lens (not shown) toward the object X under measurement. In the present embodiment, the colorimetry apparatus 400 including the light source section 410 is presented by way of example, but the light source section 410 may not be provided, for example, when the object X under measurement is a liquid crystal display or any other light emitting member.

The colorimetry sensor 420 is the optical module according to the embodiment of the invention and includes the wavelength tunable interference filter 5, the detector 11, which receives light having passed through the wavelength tunable interference filter 5, and the voltage controller 15, which applies a voltage according to the wavelength of light allowed to pass through the wavelength tunable interference filter 5, as shown in FIG. 11. The colorimetry sensor 420 further includes an optical lens for incident light that is not shown but is located in a position facing the wavelength tunable interference filter 5 and guides the reflected light reflected off the object X under measurement (light under measurement) into the colorimetry sensor 420. In the colorimetry sensor 420, the wavelength tunable interference filter 5 separates light of a predetermined wavelength from the light under measurement incident through the optical lens for incident light and the detector 11 receives the separated light. The wavelength tunable interference filter 5 may be replaced with either of the wavelength tunable interference filters 5A and 5B described above.

The control section 430 controls overall action of the colorimetry apparatus 400.

The control section 430 can, for example, be a general-purpose personal computer, a personal digital assistant, or a computer dedicated for colorimetry. The control section 430 includes a light source controller 431, a colorimetry sensor controller 432, and a colorimetry processor 433, as shown in FIG. 11.

The light source controller 431 is connected to the light source section 410 and outputs a predetermined control signal based, for example, on a user's setting input to the light source section 410 to cause it to emit white light of predetermined luminance.

The colorimetry sensor controller 432 is connected to the colorimetry sensor 420 and sets the wavelength of light to be received by the colorimetry sensor 420 based, for example, on a user's setting input and outputs a control signal to the colorimetry sensor 420 to cause it to detect the amount of light of the thus set wavelength. The voltage controller 15 in the colorimetry sensor 420 then applies a voltage to the electrostatic actuator 56 based on the control signal to drive the wavelength tunable interference filter 5.

The colorimetry processor 433 analyzes the chromaticity of the object X under measurement based on the received amount of light detected with the detector 11.

The electronic apparatus according to the embodiment of the invention can also be used as a light-based system for detecting presence of a specific substance. Examples of such a system may include an on-vehicle gas leakage detector that employs a spectroscopic measurement method using an optical filter device according to an embodiment of the invention, an optoacoustic rare gas detector for respiratory detection, and other gas detection apparatus.

An example of such a gas detection apparatus will be described below with reference to the drawings.

Figure 12:
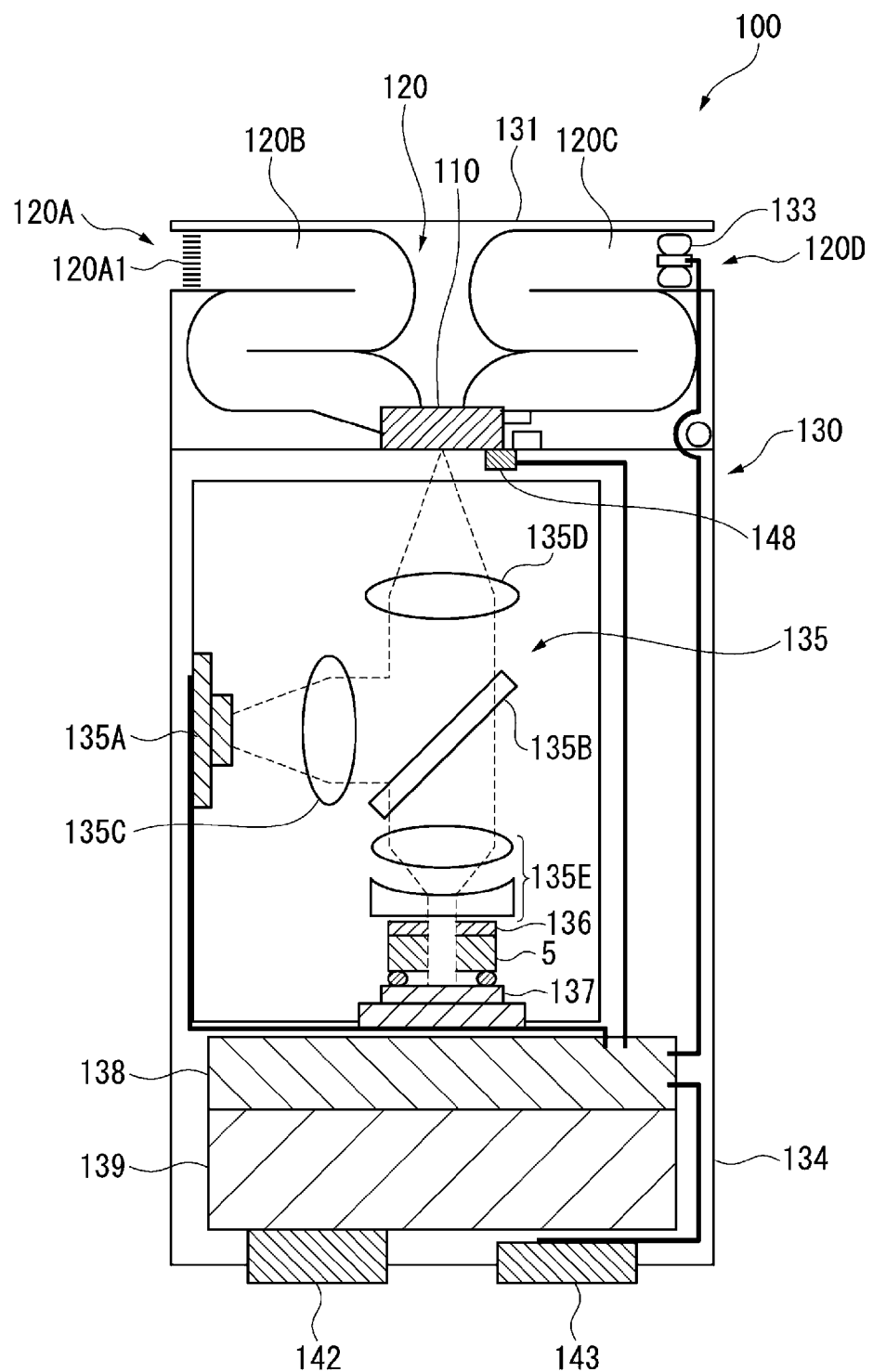
FIG. 12 shows a schematic configuration of a gas detection apparatus (electronic apparatus) including any of the wavelength tunable interference filters according to the embodiments of the invention.

FIG. 12 is a schematic view showing an example of a gas detection apparatus including an optical filter device.

Figure 13:
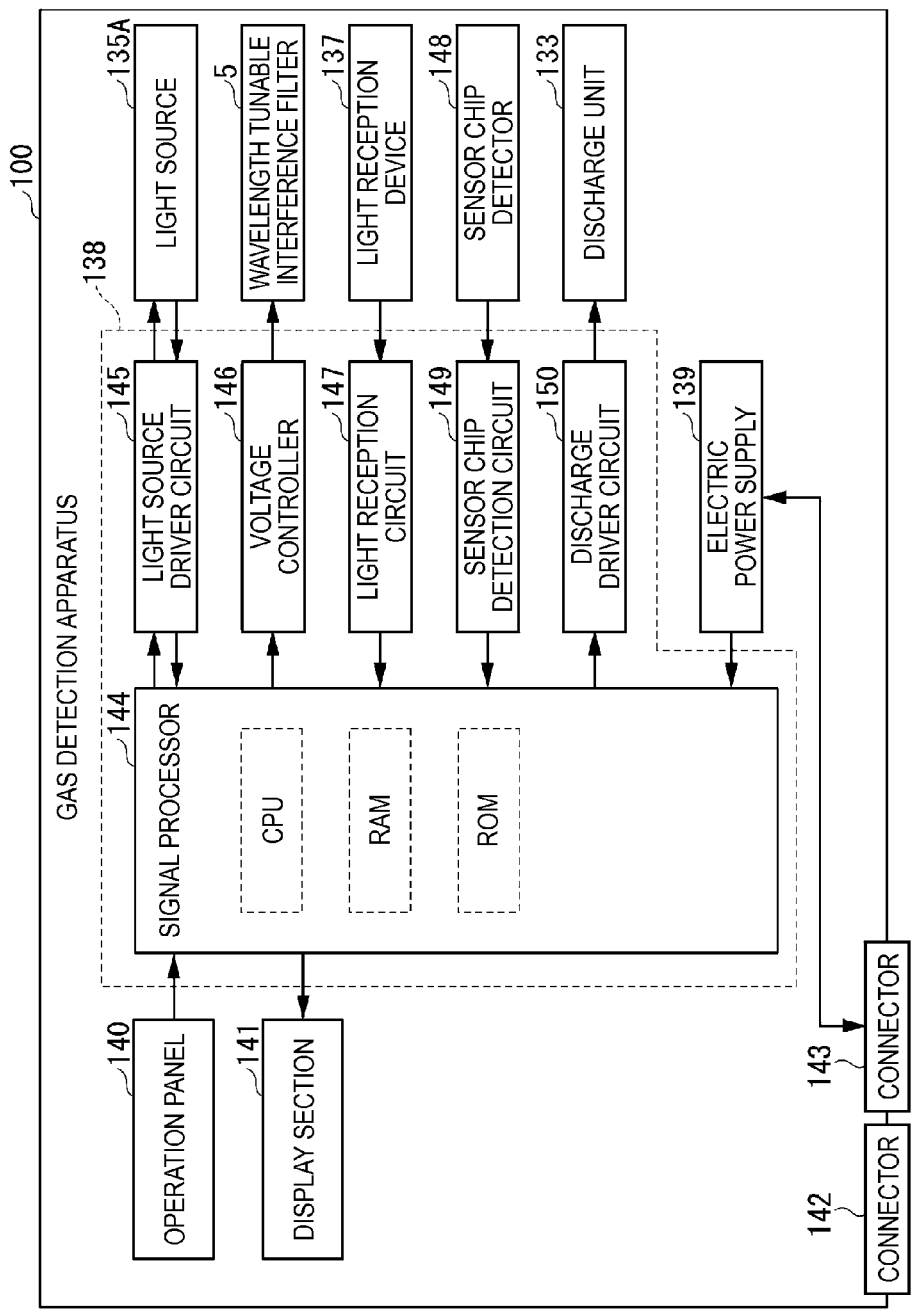
FIG. 13 is a block diagram showing a control system of the gas detection apparatus shown in FIG. 12.

FIG. 13 is a block diagram showing the configuration of a control system of the gas detection apparatus shown in FIG. 12.

A gas detection apparatus 100 includes a sensor chip 110, a channel 120 having a suction port 120A, a suction channel 120B, a discharge channel 120C, and a discharge port 120D, and a main body 130, as shown in FIG. 12.

The main body 130 includes a sensor unit cover 131 having an aperture through which the channel 120 can be attached and detached, a discharge unit 133, an enclosure 134, an optical unit 135, a filter 136, the wavelength tunable interference filter 5, a detection unit including a light reception device 137 (detector), a control unit 138, which processes a detected signal and controls the detector, and an electric power supply 139, which supplies electric power. The optical unit 135 includes a light source 135A, which emits light, a beam splitter 135B, which reflects the light incident from the light source 135A toward the sensor chip 110 and transmits light incident from the sensor chip toward the light reception device 137, and lenses 135C, 135D, and 135E.

On the exterior surface of the gas detection apparatus 100 are provided an operation panel 140, a display section 141, a connector 142 for external interfacing, and the electric power supply 139, as shown in FIG. 12. When the electric power supply 139 is a secondary battery, a connector 143 for charging purposes may be further provided.

Further, the control unit 138 in the gas detection apparatus 100 includes a signal processor 144, which is formed, for example, of a CPU, alight source driver circuit 145, which controls the light source 135A, a voltage controller 146, which controls the wavelength tunable interference filter 5, a light reception circuit 147, which receives a signal from the light reception device 137, a sensor chip detection circuit 149, which receives a signal from a sensor chip detector 148, which reads a code of the sensor chip 110 and detects whether or not the sensor chip 110 is present, and a discharge driver circuit 150, which controls the discharge unit 133, as shown in FIG. 13.

The action of the thus configured gas detection apparatus 100 will next be described.

The sensor chip detector 148 is disposed inside the sensor unit cover 131 in an upper portion of the main body 130, and the sensor chip detector 148 detects whether or not the sensor chip 110 is present. The signal processor 144, when it detects a detection signal from the sensor chip detector 148, determines that the sensor chip 110 has been attached and provides the display section 141 with a display signal that causes the display section 141 to display information representing that detection action is ready.

For example, when a user operates the operation panel 140 and the operation panel 140 outputs an instruction signal representing start of detection to the signal processor 144, the signal processor 144 first outputs a light source activation signal to the light source driver circuit 145 to activate the light source 135A. Having been driven, the light source 135A emits single-wavelength, linearly polarized, stable laser light. Further, the light source 135A has a built-in temperature sensor and light amount sensor, which output information on the temperature and the amount of light to the signal processor 144. When the signal processor 144 determines that the light source 135A is operating in a stable manner based on the temperature and the amount of light inputted from the light source 135A, the signal processor 144 controls the discharge driver circuit 150 to activate the discharge unit 133. As a result, a gaseous specimen containing a target substance (gas molecule) to be detected is guided through the suction port 120A through the suction channel 120B, the sensor chip 110, and the discharge channel 120C to the discharge port 120D. The suction port 120A is provided with a dust removal filter 120A1, which removes relatively large dust, part of water vapor, and other substances.

The sensor chip 110 is a sensor that has a plurality of metal nano-structures incorporated therein and operates based on localized surface plasmon resonance. In the thus configured sensor chip 110, the laser light incident thereon causes formation of an enhanced electric field among the metal nano-structures. When a gas molecule enters the enhanced electric field, Raman scattered light carrying information on molecular vibration and Rayleigh scattered light are produced.

The Rayleigh scattered light and the Raman scattered light are incident through the optical unit 135 on the filter 136, which separates the Rayleigh scattered light out, and the Raman scattered light is incident on the wavelength tunable interference filter 5. The signal processor 144 then controls the voltage controller 146 to adjust the voltage applied to the wavelength tunable interference filter 5 to cause the wavelength tunable interference filter 5 to separate Raman scattered light corresponding to the gas molecule under detection. Thereafter, having received the separated light, the light reception device 137 outputs alight reception signal according to the amount of received light to the signal processor 144 via the light reception circuit 147.

The signal processor 144 compares data on the spectrum of the thus obtained Raman scattered light corresponding to the gas molecule under detection with data stored in a ROM and determines whether or not the detected gas molecule is the target gas molecule to identify the substance. The signal processor 144 further displays information on the result of the identification on the display section 141 and outputs the information via the connector 142 to an external apparatus.

In FIGS. 12 and 13 described above, the gas detection apparatus 100, which performs gas detection based on Raman scattered light separated from initial Raman scattered light by the wavelength tunable interference filter 5, is presented byway of example, but a gas detection apparatus that identifies the type of gas by detecting the absorbance specific to the gas may instead be used. In this case, a gas sensor that receives a gas flowing therein and detects light absorbed by the gas out of incident light is used as the optical module according to the embodiment of the invention. A gas detection apparatus that includes the gas sensor and analyzes and identifies a gas that flows into the sensor can be the electronic apparatus according to the embodiment of the invention. The configuration described above also allows gas component detection by using the optical filter device.

The system for detecting presence of a specific substance is not limited to the gas detection system described above. Another system for detecting presence of a specific substance can, for example, be a substance composition analyzer, such as a noninvasive measurement apparatus for measuring sugars based on near-infrared spectroscopy and a noninvasive measurement apparatus for acquiring information on food, biological body, mineral, and other substances.

A food analyzer will be described below as an example of the substance composition analyzer described above.

Figure 14:
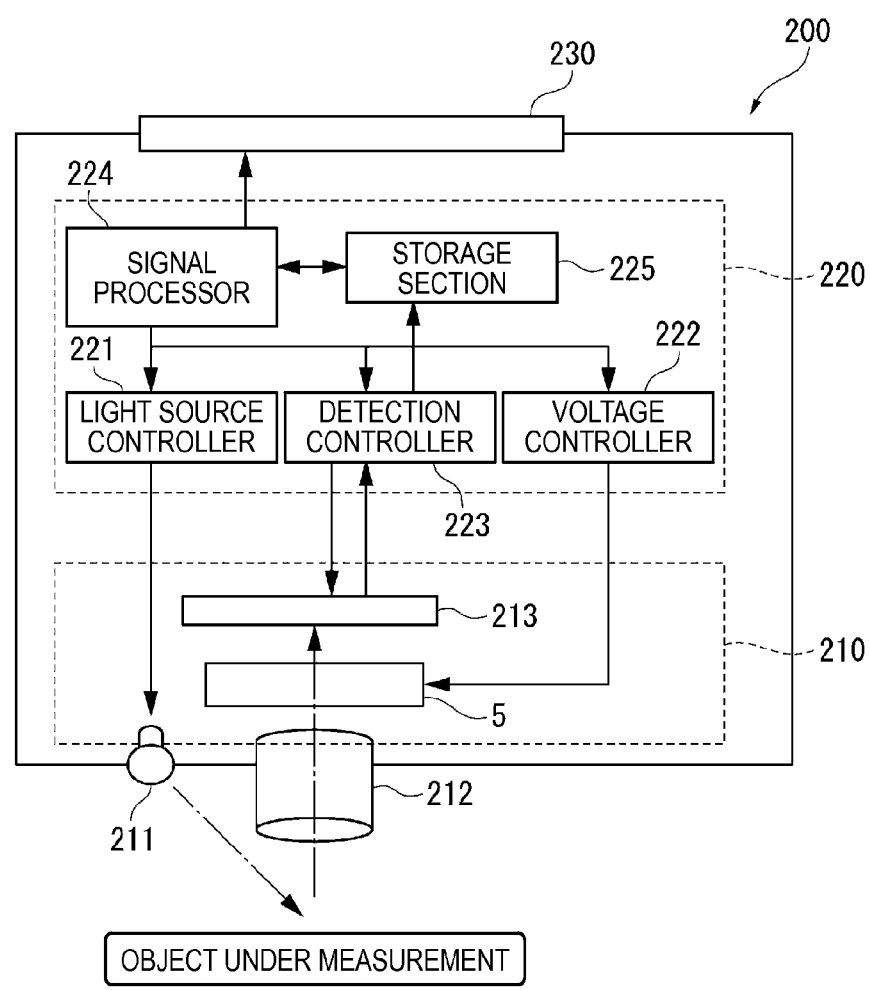
FIG. 14 shows a schematic configuration of a food analyzer (electronic apparatus) including any of the wavelength tunable interference filters according to the embodiments of the invention.

FIG. 14 shows a schematic configuration of a food analyzer that is an example of the electronic apparatus using the wavelength tunable interference filter 5.

A food analyzer 200 includes a detection unit 210 (optical module), a control unit 220, and a display unit 230, as shown in FIG. 14. The detection unit 210 includes a light source 211, which emits light, an imaging lens 212, which introduces light from an object under measurement, the wavelength tunable interference filter 5, which separates desired light from the light introduced through the imaging lens 212, and an imager 213 (detector), which detects the separated light.

The control unit 220 includes a light source controller 221, which performs light-on/off control on the light source 211 and also performed luminance control when the light source 211 is emitting light, a voltage controller 222, which controls the wavelength tunable interference filter 5, a detection controller 223, which controls the imager 213 and acquires a spectroscopic image captured with the imager 213, a signal processor 224, and a storage section 225.

In the food analyzer 200, when the system thereof is driven, the light source controller 221 controls the light source 211 to cause it to emit light toward an object under measurement. Light reflected off the object under measurement then passes through the imaging lens 212 and enters the wavelength tunable interference filter 5. A voltage that allows light of a desired wavelength to be separated is applied to the wavelength tunable interference filter 5 under the control of the voltage controller 222, and the separated light is captured as an image with the imager 213 formed, for example, of a CCD camera. The captured image light is accumulated as a spectroscopic image in the storage section 225. The signal processor 224 controls the voltage controller 222 to change the value of the voltage applied to the wavelength tunable interference filter 5 to acquire spectroscopic images of a variety of wavelengths.

The signal processor 224 then computes data from the pixels of each of the images accumulated in the storage section 225 to determine a spectrum at each of the pixels. The storage section 225 has further stored, for example, information on the composition of food corresponding to a spectrum, and the signal processor 224 analyzes data on the obtained spectra based on the information on food stored in the storage section 225 to determine food components contained in the object under detection and the contents of the food components. Further, the calorie, the degree of freshness, and other factors of the food can be calculated based on the resultant food components and contents thereof. Moreover, the spectral distribution in each image can be analyzed, for example, to extract a portion of the food under inspection where freshness has lowered and even detect foreign matter and other undesirable objects contained in the food.

The signal processor 224 then displays information on the thus obtained components, contents, calorie, freshness, and other factors of the food under inspection on the display unit 230.

In addition to the example of the food analyzer 200 shown FIG. 14, substantially the same configuration can be used as noninvasive measurement apparatus described above that measure other types of information. For example, a bioanalyzer that analyzes biological components, for example, measures and analyzes blood or other bodily fluid components, can be provided. A bioanalyzer of this type, for example, an apparatus that measures blood and other bodily fluid components, can be an apparatus that senses ethyl alcohol, which can be used as a drunk-driving prevention apparatus that detects the state of a drunk driver. Further, an electronic endoscope system including a bioanalyzer of this type can be provided.

Moreover, a mineral analyzer that analyzes mineral components can be provided.

Further, the interference filter, the optical module, and the electronic apparatus according to the embodiments of the invention are applicable to the following apparatus.

For example, changing the intensity of light of a variety of wavelengths over time allows the light of the variety of wavelengths to transmit data. In this case, in the optical module including the interference filter according to any of the embodiments of the invention, the interference filter extracts light of a specific wavelength and a light receiver receives the light for extraction of the data transmitted by the light of the specific wavelength. An electronic apparatus including the data extraction optical module can process the data carried by the light of the variety of wavelengths for optical communication.

Further, the electronic apparatus according to the embodiment of the invention can be used as a spectroscopic camera that captures a spectroscopic image, a spectroscopic analyzer, and other apparatus by using the interference filter provided in the optical filter device according to the embodiment of the invention to extract light. An example of a spectroscopic camera of this type may include an infrared camera in which the wavelength tunable interference filter is incorporated.

Figure 15:
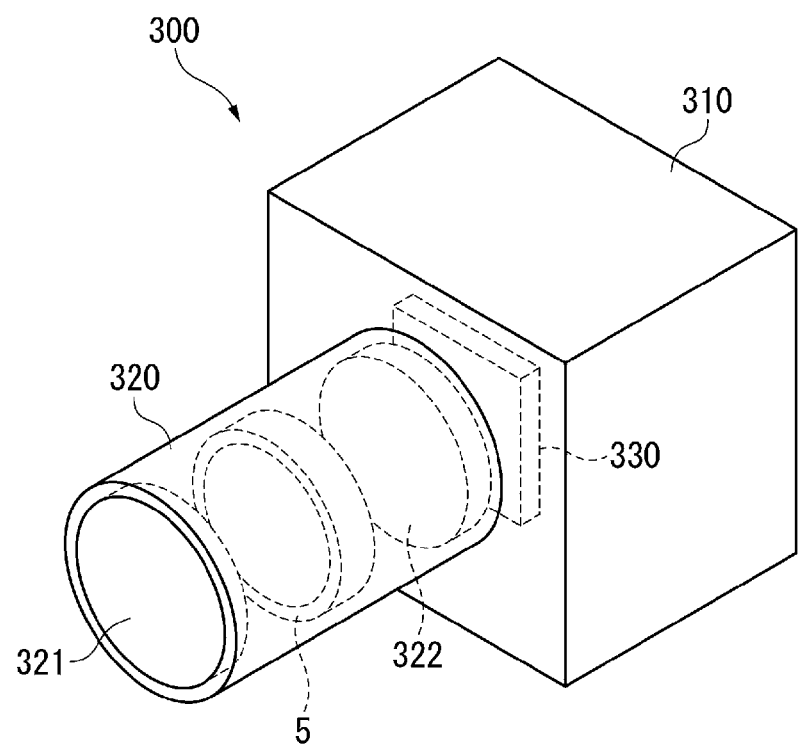
FIG. 15 shows a schematic configuration of a spectroscopic camera (electronic apparatus) including any of the wavelength tunable interference filters according to the embodiments of the invention.

FIG. 15 is a diagrammatic view showing a schematic configuration of a spectroscopic camera. A spectroscopic camera 300 includes a camera body 310, an imaging lens unit 320, and an imager 330 (detector), as shown in FIG. 15.

The camera body 310 is a portion grasped and operated by a user.

The imaging lens unit 320 is attached to the camera body 310 and guides incident image light to the imager 330. The imaging lens unit 320 includes an objective lens 321, an image forming lens 322, and the wavelength tunable interference filter 5 disposed between the two lenses, as shown in FIG. 15.

The imager 330 is formed of a light reception device and captures the image light guided through the imaging lens unit 320.

The thus configured spectroscopic camera 300, in which the wavelength tunable interference filter 5 transmits light of a wavelength to be captured as an image, can capture a spectroscopic image formed by the light of a desired wavelength.

Further, the optical filter device including the interference filter according to any of the embodiments of the invention may be used as a bandpass filter. For example, the optical filter device can be used as an optical laser apparatus in which the interference filter receives light within a predetermined wavelength region emitted from a light emitting device, extracts only narrow-band light around a predetermined wavelength, and transmits the extracted light.

Moreover, the optical filter device including the interference filter according to any of the embodiments of the invention may be used as a biometrics authentication apparatus. For example, the optical filter device is also applicable to an authentication apparatus based on blood vessels, fingerprints, retina, iris, or any other body part by using near-infrared light or visible light.

Further, the optical module and the electronic apparatus according to the embodiments of the invention can be used as a concentration detection apparatus. In this case, the interference filter extracts infrared energy (infrared light) radiated from an object, and the energy is analyzed for measurement of the concentration of a subject in a sample.

As described above, the interference filter, the optical module, and the electronic apparatus according to the embodiments of the invention are applicable to any apparatus that separates predetermined light from incident light. Since the optical filter device including the interference filter according to any of the embodiments of the invention can by itself extract light of a plurality of wavelengths as described above, spectral measurement based on the plurality of wavelengths and detection of a plurality of components can be performed with precision. Therefore, each of the optical module and the electronic apparatus has a size further smaller than the size of an apparatus of related art that extracts light of a desired wavelength by using a plurality of devices and can, for example, be preferably used as a portable or on-vehicle optical device.

In addition, the specific structure according to an embodiment of the invention may be an appropriate combination of the embodiments and the variations described above or may be changed as appropriate to any other structure in actual implementation of the invention to the extent that the advantage of the invention is achieved.

The entire disclosure of Japanese Patent Application No. 2013-054682 filed on Mar. 18, 2013 is expressly incorporated by reference herein.

What is claimed is:

1. A sealing structure for an interference filter comprising:
a first substrate;
a second substrate that faces the first substrate;
a first bonding portion that bonds the first substrate and the second substrate to each other;
a sealing portion that is disposed between the first substrate and the second substrate in an interspace that allows an internal space sandwiched between the first substrate and the second substrate to communicate with a space outside the sealing structure, the sealing portion sealing the internal space;
a third substrate disposed on the opposite side of the second substrate to the first substrate; and
a second bonding portion that bonds the second substrate and the third substrate to each other
wherein an inter-substrate distance between the first substrate and the second substrate in the interspace decreases in a direction from outer circumferential edges of the first substrate and the second substrate toward an inner portion of the interspace in a plan view in which the first substrate and the second substrate are viewed in a substrate thickness direction;
wherein the sealing portion is disposed between the second substrate and the third substrate in a second interspace that allows a second internal space sandwiched between the second substrate and the third substrate to communicate with a space outside the interference filter, the sealing portion sealing the second internal space, and
an inter-substrate distance between the second substrate and the third substrate in the second interspace decreases in a direction from outer circumferential edges of the second substrate and the third substrate toward an inner portion of the second interspace in the plan view.

2. The sealing structure according to claim 1,
wherein the interspace is formed by a plurality of steps formed on at least one of the first substrate and the second substrate.

3. The sealing structure according to claim 1,
wherein the interspace is formed by an inclined surface formed on at least one of the first substrate and the second substrate.

4. An interference filter comprising:
a first substrate;
a second substrate that faces the first substrate, the second substrate being movable relative to the first substrate;
a third substrate disposed on the opposite side of the second substrate to the first substrate;
a first reflection film provided on the first substrate;
a second reflection film provided on the second substrate and facing the first reflection film;
a bonding portion that bonds the first substrate and the second substrate to each other;
a second bonding portion that bonds the second substrate and the third substrate to each other; and
a sealing portion that is disposed between the first substrate and the second substrate in a first interspace that allows a first internal space sandwiched between the first substrate and the second substrate to communicate with a space outside the interference filter, the sealing portion sealing the first internal space,
wherein an inter-substrate distance between the first substrate and the second substrate in the first interspace decreases in a direction from outer circumferential edges of the first substrate and the second substrate toward an inner portion of the interspace in a plan view in which the first substrate and the second substrate are viewed in a substrate thickness direction;
the sealing portion is disposed between the second substrate and the third substrate in a second interspace that allows a second internal space sandwiched between the second substrate and the third substrate to communicate with a space outside the interference filter, the sealing portion sealing the second internal space, and
an inter-substrate distance between the second substrate and the third substrate in the second interspace decreases in a direction from outer circumferential edges of the second substrate and the third substrate toward an inner portion of the second interspace in the plan view.

5. The interference filter according to claim 4,
wherein the first interspace is formed by a plurality of steps formed on at least one of the first substrate and the second substrate.

6. The interference filter according to claim 4,
wherein the first interspace is formed by an inclined surface formed on at least one of the first substrate and the second substrate.

7. The interference filter according to claim 4,
wherein the second interspace is formed by a plurality of steps formed on at least one of the second substrate and the third substrate.

8. The interference filter according to claim 4,
wherein the second interspace is formed by an inclined surface formed on at least one of the second substrate and the third substrate.

9. The interference filter according to claim 4,
wherein internal pressure in the first internal space and the second internal space is lower than the atmospheric pressure.

10. The interference filter according to claim 4, further comprising:
a gap changer that changes the dimension of a gap between the first reflection film and the second reflection film,
wherein the second substrate has a through hole that allows the first internal space and the second internal space to communicate with each other.

11. The interference filter according to claim 4,
wherein the sealing portion is made of a paraxylene-based polymer.

12. The interference filter according to claim 4,
wherein the sealing portion is formed in an atomic layer deposition process or a chemical vapor deposition process.

13. The interference filter according to claim 4,
wherein the bonding portion is a plasma polymerization film.

14. An optical module comprising:
the interference filter according to claim 4; and
a detector that detects light extracted by the first reflection film and the second reflection film.

15. An electronic apparatus comprising:
the interference filter according to claim 4; and
a control unit that controls the interference filter.

* * * * *